United States Patent [19]

Uehlinger et al.

[11] Patent Number: 4,846,033
[45] Date of Patent: Jul. 11, 1989

[54] APPARATUS FOR MAKING BLANKS AND STRIPS OF BLANKS

[75] Inventors: Werner H. Uehlinger, Arlesheim, Switzerland; Jozef T. Franek, Chorleywood, United Kingdom

[73] Assignee: KM-Engineering AG, Basel, Switzerland

[21] Appl. No.: 47,022

[22] Filed: May 6, 1987

Related U.S. Application Data

[62] Division of Ser. No. 751,040, Jul. 1, 1985, Pat. No. 4,681,001.

[51] Int. Cl.$^4$ ............................................. B23D 25/12
[52] U.S. Cl. ........................................ 83/94; 83/300; 83/302; 83/303; 83/333; 83/345; 83/667; 83/682
[58] Field of Search ................ 83/302, 303, 333, 345, 83/40–42, 46, 48, 50, 300, 667, 682, 39, 47, 37

[56] References Cited

U.S. PATENT DOCUMENTS

| | | | |
|---|---|---|---|
| 1,433,138 | 10/1922 | Kruse | 83/333 X |
| 1,532,538 | 4/1925 | Langston | 83/302 |
| 1,679,883 | 8/1928 | Speer | 83/302 X |
| 1,812,654 | 6/1931 | Kirschbraun | 83/302 |
| 1,826,889 | 10/1931 | Koch | 83/333 X |
| 1,957,863 | 5/1934 | Tuttle et al. | 83/302 X |
| 2,151,028 | 3/1939 | Hayward | 83/302 X |
| 2,378,041 | 6/1945 | Sebell | 83/251 X |
| 2,387,767 | 10/1945 | Nordquist | 83/343 |
| 3,106,859 | 10/1963 | Huffman | 83/345 |
| 3,388,582 | 6/1968 | Wesstrom et al. | 83/333 X |

FOREIGN PATENT DOCUMENTS

| | | |
|---|---|---|
| 558820 | 12/1957 | Belgium . |
| 1149968 | 5/1973 | Fed. Rep. of Germany . |
| 2353226 | 5/1975 | Fed. Rep. of Germany . |
| 2711117 | 9/1978 | Fed. Rep. of Germany . |
| 2827138 | 1/1980 | Fed. Rep. of Germany . |
| 2710855 | 11/1982 | Fed. Rep. of Germany . |
| 3125843 | 1/1983 | Fed. Rep. of Germany . |
| 1123017 | 9/1956 | France . |
| 2167554 | 8/1973 | France . |
| 2315367 | 1/1977 | France . |
| 148499 | 5/1981 | German Democratic Rep. . |
| WO/84/036-47 | 9/1984 | PCT Int'l Appl. . |
| 422502 | 9/1974 | U.S.S.R. . |
| 942984 | 7/1982 | U.S.S.R. . |
| 990375 | 1/1983 | U.S.S.R. . |

OTHER PUBLICATIONS

Littell, LM-1 Scroll Sheeting Line, Bulletin G-36 pp. 1–20.

Primary Examiner—Frank T. Yost
Attorney, Agent, or Firm—Ralph W. Selitto, Jr.

[57] ABSTRACT

Polygonally-shaped blanks useful in making products such as can parts are formed by dividing a relatively wide web of material into a plurality of relatively narrow strips, each strip having longitudinal edges delimited by scroll lines formed from a plurality of straight scroll line sections. The strips can be arranged parallel to a longitudinal axis of the web or at an angle relative thereto. It is also possible to divide the strips into individual blanks at a scrolling station or at a remote can making station. The polygonal shape of the blanks permits them to be designed so as to compensate for earing caused by the anisotropy of the material from which the web is made. Various punches and slitting arrangements can be employed to perforate the web and to longitudinally and laterally cut it so as to form the strip and/or blanks therefrom.

31 Claims, 35 Drawing Sheets

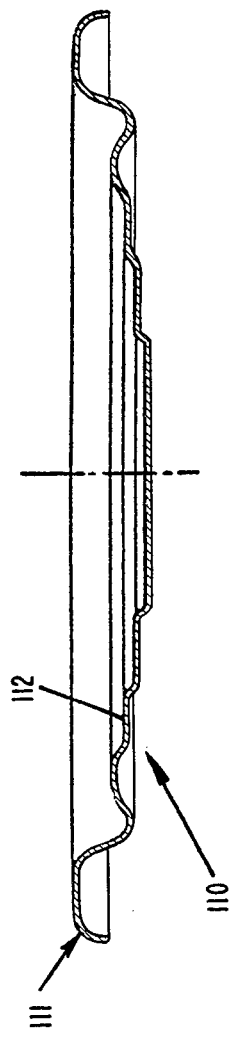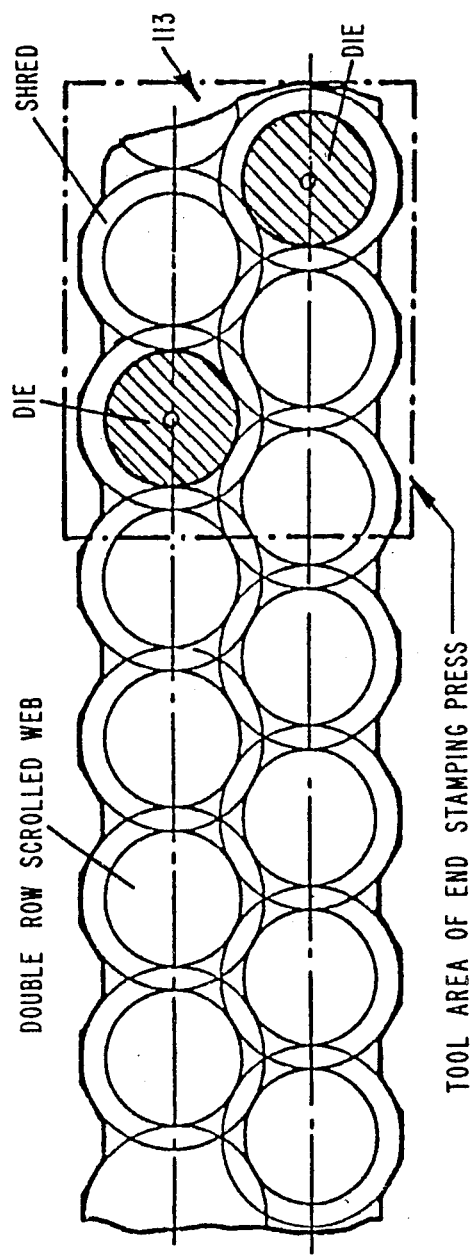
FIG. 5C
FIG. 5D

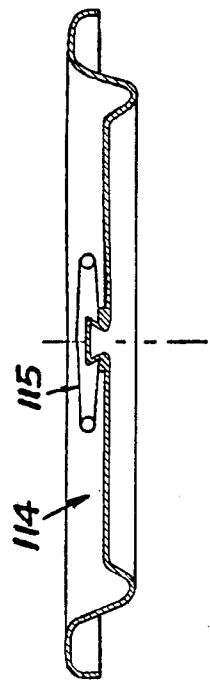
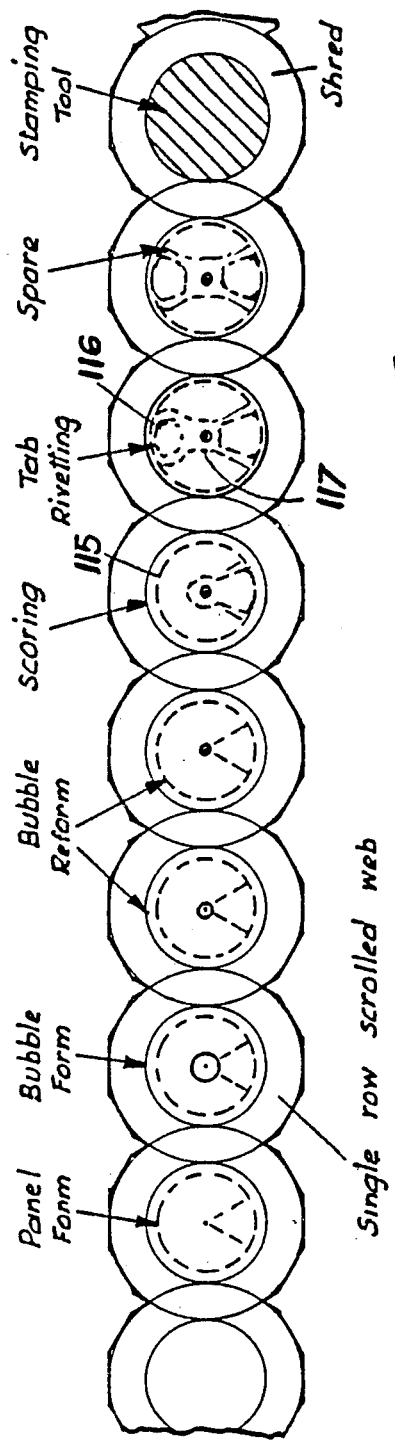

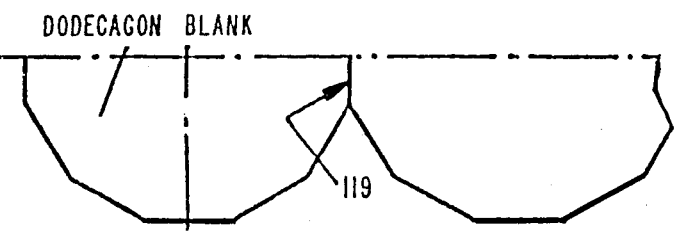
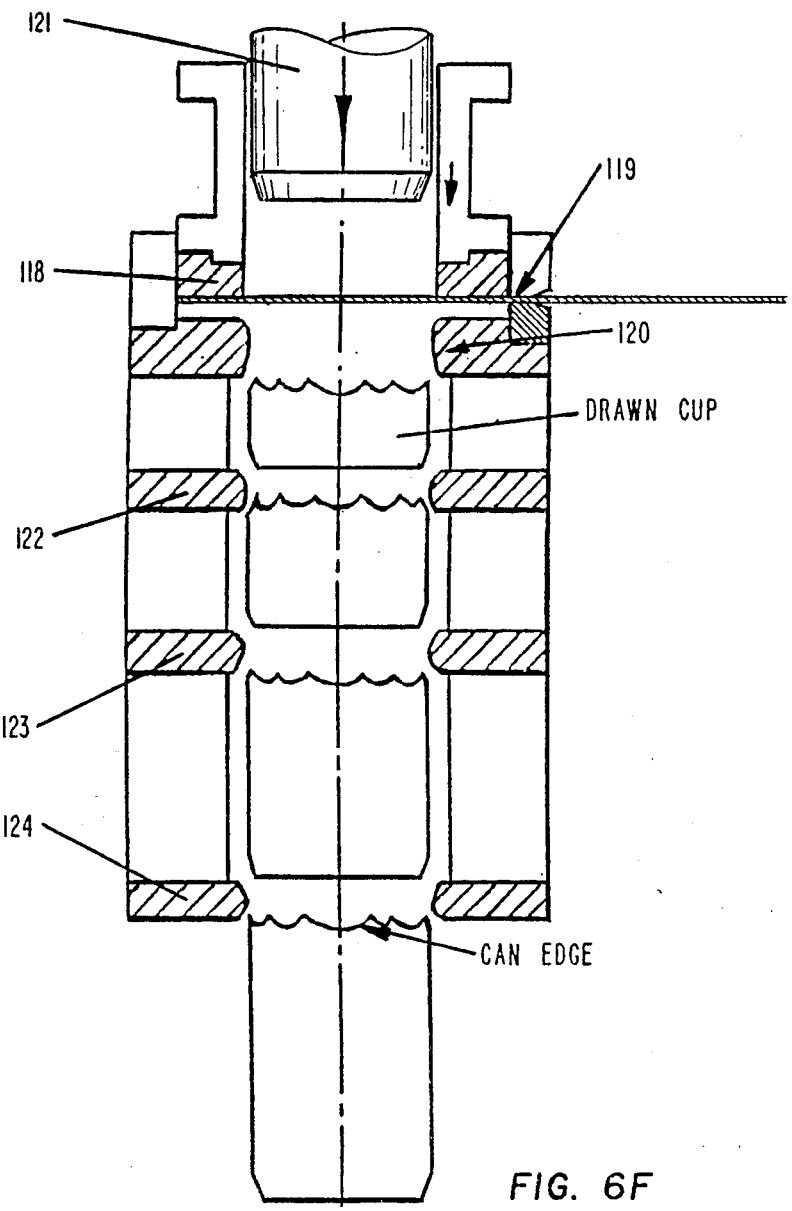
FIG. 6E
FIG. 6F

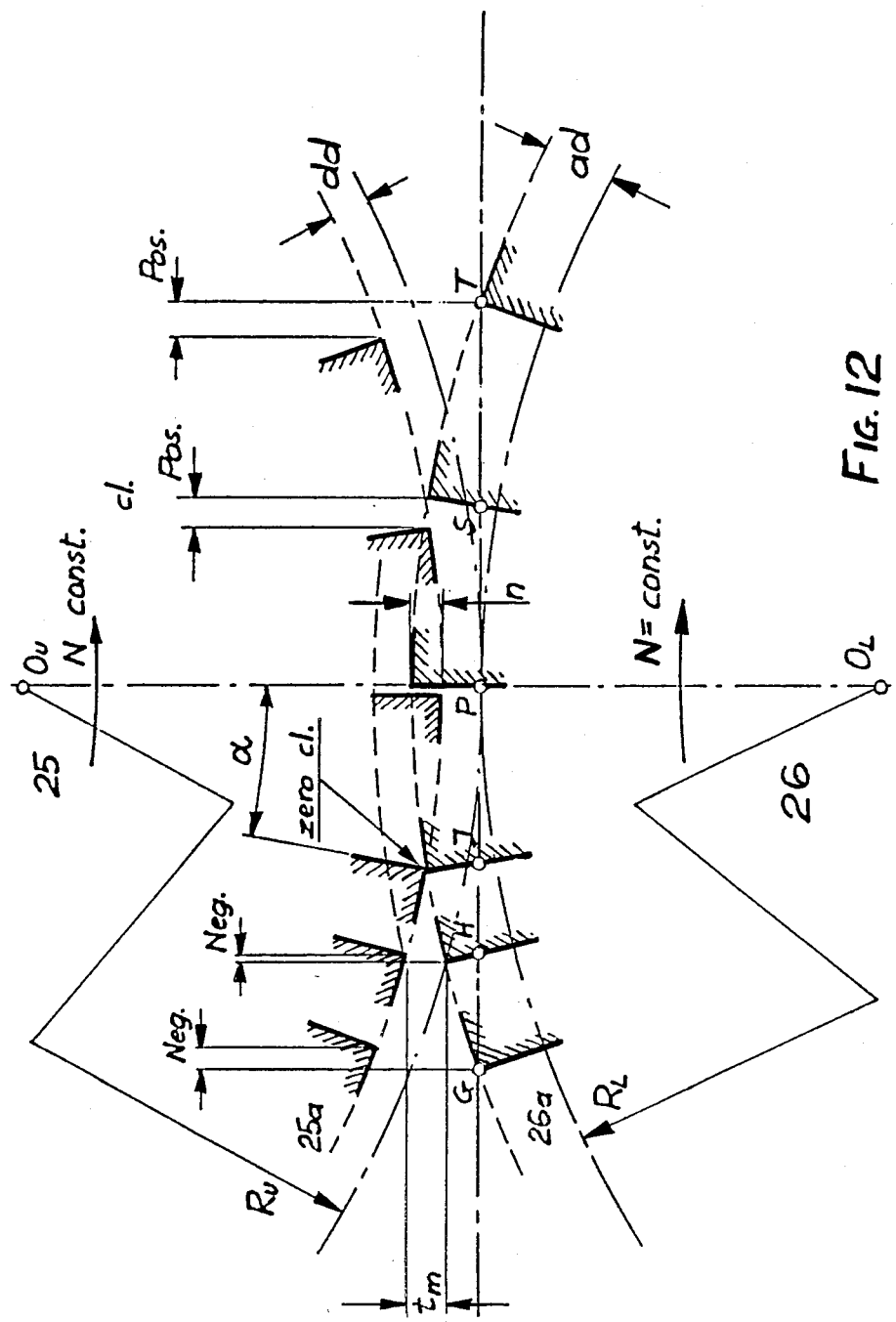

APPARATUS FOR MAKING BLANKS AND STRIPS OF BLANKS

This is a division of application Ser. No. 751,040, filed July 1, 1985, now U.S. Pat. No. 4,681,001.

FIELD OF THE INVENTION

The present invention relates to the formation of blanks or strips of blanks, and, more particularly, to methods and apparatus for slitting, cutting and perforating a web of material to form such blanks or strips.

BACKGROUND OF THE INVENTION

In the conversion processes of sheet or coiled metals and nonmetals, including laminations, the area usage efficiency of the material is of primary importance and essential for economic and competitive operations. The economic aspects are of special relevance, particularly in the packaging industry which depends almost entirely on massive output quantities, wherein the efficiency of material usage has been recognized for many years as being very important, especially when individual blanks from which a given component is made are round or circular in shape.

If the conversion equipment contains only one blanking tool, the material utilization efficiency factor could be $\pi/4$ at best, when no shred allowance in the remaining skeleton is contemplated. Hence, in practice, the optimum material utilization factor would be around 75 percent, while leaving a manageable skeleton in the rectangular strips or straight-sided webs.

In the case of multi-tool equipment, wherein two or more blanks are simultaneously stamped, it is possible to employ a 60° staggered pattern, which improves the material utilization factor to a figure of around 85 percent depending on the shred width in the remaining skeleton and the number of blanks accommodated across the width of the web. Such a figure is usually achieved when non-coated stock is employed, but can also be achieved when high volume justifies coil coating.

Over the past thirty years, can making industries started so-called primary scrolling of coiled materials to thereby produce sheets with scrolled leading and trailing edges. Such sheets could then be coated and secondarily scrolled, before being converted into components, to form single row, double row, or even multiple row strips. This practice results in a material utilization factor of about 85 percent depending on the shred width in the remaining skeleton.

In most applications of present can making practice, circular blanks are used for the manufacture of can end components or for providing "cups" suitable for so-called "two-piece cans", wherein the circular base and cylindrical wall are joined without any seams. The material for the two-piece cans may be of a ferrous or non-ferrous character.

Usually the rolling mills finish the coils specified for deep drawing in such a way that so-called "earing" caused by the cupping operation is at a minimum. Earing is due to the anisotropy of the grain structure in the materials, the typical number of ears in ferrous materials being six. For circular blanks, earing results in the use of a larger diameter blank in order to provide an acceptably high cup. To avoid the use of larger diameter blanks, non-circular blanks could be used, such blanks providing additional material from the skeleton shred in the localities between the anticipated ears in the cup. However, blanking dies for such blanks are not practicable.

The established practice anticipates efficient utilization of wide coiled material using multi-die cuppers, which is practicable for high outputs only. To keep high utilization of material in case of low production outputs, wherein a single blanking or cupping tool is applicable, the coiled material needs to be processed twice, namely at first to cut the web into sheets, i.e., primary scrolling, and then secondly to cut the sheets into strips by secondary scrolling. This means more handling through costly additional equipment. Hence, single tool, low output mini-lines cannot compete successfully with the high speed multi-die production lines.

SUMMARY OF THE INVENTION

The present invention has numerous objects in view of the problems and shortcomings of the prior art described above. For instance, one object is to provide a method and apparatus for longitudinally scroll slitting a wide web of coiled material to provide narrow strips containing one, two or three rows of blanks, the strips being suitable for blanking or cupping by an appropriate tool arrangement. The strips are designed so as to minimize the shred generated by cutting out individual blanks, thus offering economic material area utilization.

Another object of the present invention is to provide a method and apparatus for longitudinally scroll slitting a wide web of coiled material, as aforesaid, wherein slitting is combined with punching of triangular holes in the web in a specific relationship relative to the longitudinal scrolled edges, thereby creating a strip containing a single row of blanks. By cropping the strip along discrete lines, twelve-sided blanks are produced. These blanks, which are especially adapted for cupping, produce no shred during the cupping operation and, thus, substantially increase the efficiency of material utilization.

A further object of the invention is to arrange the twelve-sided blank configuration, produced as aforesaid, in such a way that the effect of anisotropy in the form of ears and valleys between the ears in the drawn cups can be compensated for by adding extra material in the localities between the potential ears. By taking such extra material from an area of the web which would normally be disposed of as scrap, the material utilization factor can be increased above that for circular blanks without shred allowance in case of homogeneous isotropic materials.

Yet another object of the invention is to extend the use of the twelve-sided blanks, produced as aforesaid, to strips containing more than one row of blanks and up to full width webs, wherein punching tools are provided in front of the cupping dies. The cupping dies are provided with cropping tools such that no shred skeleton is left after the cupping operation.

A still further object of the present invention is to provide a method and apparatus for simultaneously scroll slitting and cutting the web with punched triangular-shaped holes by using a combination of scroll slitting knives and flying scroll dies. Double scrolled strips thus obtained are suitable for circular blanking and may also be used for making twelve-sided blanks, because the wide web has been pre-punched with triangular-shaped holes. The slitting knives and the flying dies will produce twelve-sided blanks in one operation, thus saving handling and additional equipment.

In accordance with one aspect of the invention, the application of rotating circular knife slitters is extended, so that it is possible to slit a wide web of coiled material into narrow strips having scrolled edges. The slitters have suitably shaped cutting edges, the geometry of which constitutes a novel improvement over the prior art. Normally, there would be two counterrotating intergeared cutter shafts, each completely symmetric and, hence, fully balanced for pure rotary motion. Such an arrangement is capable of performing at tangential velocities in the region of 500 meters per minute without any constraints.

A slitting line constructed in accordance with another aspect of the present invention could, for instance, consist of an uncoiler, a rotary slitter and a recoiling arrangement suitable for several narrow coils. Because of high speed capability, simplicity of operation and a less expensive slitting arrangement, the cost of such a longitudinal scrolling operation should be comparable to that of a standard slitting operation. In addition to providing strips having single, double, triple and even quadruple rows of blanks, depending on the ultimate conversion arrangement, blanks may be punched on a simple press. Normally, such material would be blanked leaving afterwards a skeleton shred, which needs to be chopped for easier handling. The width of the shred will vary depending on material thickness and cut edge diameter, so the ultimate material area utilization factor will depend on the width of the shred.

The present invention creates the opportunity to dispose of the shred altogether, thus increasing the area of material available for processing, which not only improves the economics of the process, but also decreases the material handling problems due to the absence of shred. Such material saving is accomplished, in accordance with a further aspect of the invention, by suitable slitting which leads to the formation of twelve-sided blanks. This is accomplished by employing an additional operation which involves the removal of triangular-shaped fragments from the scrolled edges. There are several ways of removing the triangular-shaped fragments. Firstly, the scrolled web can be fed straight into the cupping tool, which is provided with additional cropping facilities creating, however, handling problems for the triangles. Secondly, the triangles could be punched out before the slitting operation. Thirdly, the triangles could be removed after the slitting operation. Following the second and third triangle removing methods, the web may be fed to the cupping tool, which would be provided with a simple cropping tool to isolate one twelve-sided blank from the front or leading end of the web. In such a case, the die and the blank holder of the cupping tool have to be suitably shaped to clamp the entire area of the twelve-sided blank.

The provision of twelve-sided blanks creates an opportunity to compensate for the effect of anisotropy of the material. For example, in the case of ferrous materials, the steel makers arrange the strip finishing operation in such a way that normally after cupping a circular blank, a cup with six ears is obtained. Two ears are directly in line with the direction of rolling, whereas the other four ears are displaced 60° from the direction of rolling. Between the ears the cup is shorter and in effect six valleys are formed. The wall thickness at the ears is lower and at the valleys material thickening takes place, which is caused by the fact that the cup is shorter in these localities, and also by tangential shift of material from the ears to the valleys.

With twelve-sided blanks, it is possible to add some material at the localities where valleys are expected between the ears. By coincidence, ears are positioned at the points of tangency with other blanks in the 60° staggered blank pattern, and the valleys are opposite the unutilized area of material, which is normally lost with the shred skeleton. Hence, in practice, there is an opportunity not only to compensate for the effect of earing but to permit the use of even more material, by decreasing the area of the triangles, to create ears at the localities of valleys, which then in turn displaces some material tangentially into the original ears, thus resulting in a higher cup compared with the cup made from a circular blank. It is therefore possible to decrease the diameter of the blank by 1–2%, the exact amount being determinable by experimentation. It is thus evident that the twelve-sided blank offers material savings thanks to three parameters: (a) the absence of shred between tangential circle pattern, (b) the possibility to compensate for the effect of earing and (c) the opportunity of utilizing a limited further amount of material from a normally unused area in the skeleton.

The benefits of the twelve-sided blank are great and the present invention, in accordance with another aspect of the invention, contemplates the conversion of wide coiled webs and sheets into twelve-sided blanks or into cups from twelve-sided blanks by application of a suitably tooled single action press or by application of a double-action cupper. Obviously, such a system is especially adapted for high volume production, or for a high speed twelve-sided blank preparation, or for slow speed or low output two-piece can making. There would be depending on the blank size, five or more blanking tools preceded by the same number of triangular punch sets, each set having two punches per corresponding blanking tool. The edges of the wide web have to be prepared suitably by cutting off the web width allowance and removing large triangular segments between two blanks and the edge of the web. Hence, the superfluous material from the web is removed before reaching the blanking tool, which is deemed advantageous, since blanks can be then taken away at the back of the blanking press without any hindrance normally created by the scrap disposal arrangement.

According to a still further aspect of the invention, it is possible to combine scroll slitting with cutting up of the webs into short length strips or sheet. Essentially, it is necessary to punch out the triangular holes before presenting the web to the slitting and cutting-up equipment, thereby enabling the scroll slitting cutters to perform their function without any interference from the crop-off dies. The triangular hole punching assembly includes two counterrotating, backlash-free intergeared shafts, the top shaft carrying punches at predetermined localities and the lower shaft carrying the corresponding dies. The dies are provided with knock-out pads which eject the cut-out triangles of material into a chute positioned below the lower shaft. The pre-punched web enters into the scroll slitting assembly, which consists of two counterrotating blacklash-free intergeared shafts, each being provided with ring-type cutters fixed rigidly on the shafts. The side faces of these cutters are suitably shaped to slit the web passing therebetween along lines inclined at 30° to the direction of the web movement. At the localities corresponding to the triangular holes, there are positioned straight cropping dies with their edges in line with the axis of the cutter shafts. The cropping dies may be positioned at the intervals corresponding to the pitch of the triangular holes in the web, and, in such a case, twelve-sided blanks would be produced directly from the web. It is, of course, possible to install one cropping tool only to produce double-scrolled strips, which may be used subsequently for round hole blanking and cupping, or these strips may be cut up into twelve sided blanks in a separate arrangement, or on the conversion machine which draws cups from the twelve-sided blanks during the first operation. This aspect of the invention simplifies the scroll slitting line, since it disposes of the recoiling system and of narrow web handling provisions. Instead blank stacking facilities are required. The blank stacking nd storing system must be compatible with the feeding arrangement on the conversion machine.

The application of longitudinal scroll slitting techniques to the production of twelve-sided blanks is made possible by the adaptation of the well-proven slitting arrangement, for straight sided webs, to include scrolled features, which embrace cutting lines inclined to the direction of web movement at any angle between 0° and 90°. This capability is made possible by special novel features in the apparatus, which define exactly the relationship between the two counterrotating and backlash-free intergeared cutter shafts and the strictly defined relationship between the cutting edges, to maintain and ensure correct cutting clearance, which is ideally one-tenth of the material thickness varying normally for can stock between 0.15 mm and 0.20 mm, without any clash between the cutting edges. Having determined the requirements in the geometry of the cutting edges, it is not only possible to slit along straight lines, but also to extend the slitting principles to angular slitting and to cutting across the movement of the web, while still maintaining a correct cutting relationship between the tool edges, thereby enabling punching of round holes and triangular holes with tools performing simple rotating motions, characteristic of the familiar slitting arrangement, which as will be shown, lends itself for "flying shear" operations well known in the coiled material cutting-up processes. By the nature of the arrangement for slitting in which all working parts perform constant speed rotary motion, there is little limitation to the output rate. Controlling the blanks after slitting and cropping might be more difficult because of the multi-lane character.

In summary, the present invention converts coiled material into blanks for two-piece can manufacture, while maximizing material utilization.

BRIEF DESCRIPTION OF THE DRAWINGS

For a better understanding of the present invention, reference is made to the following detailed description of various aspects of the invention considered in conjunction with the accompanying drawings, in which:

FIG. 5C shows a typical can end component;

FIG. 5D shows a double row longitudinally scrolled web;

FIG. 6C is a cross-section of a typical easy open end component for beverage cans;

FIG. 6D shows, diagrammatically, a progression of operations to produce the end component of FIG. 6C;

FIG. 6E shows a fragment of a scrolled web;

FIG. 6F shows a drawing and wall ironing tool for the conversion of dodecagon blanks into can bodies;

FIG. 12 is an enlarged view of a new and improved tool geometry for cutting a web by flying knives attached to two counterrotating, backlash-free intergeared shafts;

DETAILED DESCRIPTION

Figure 1:
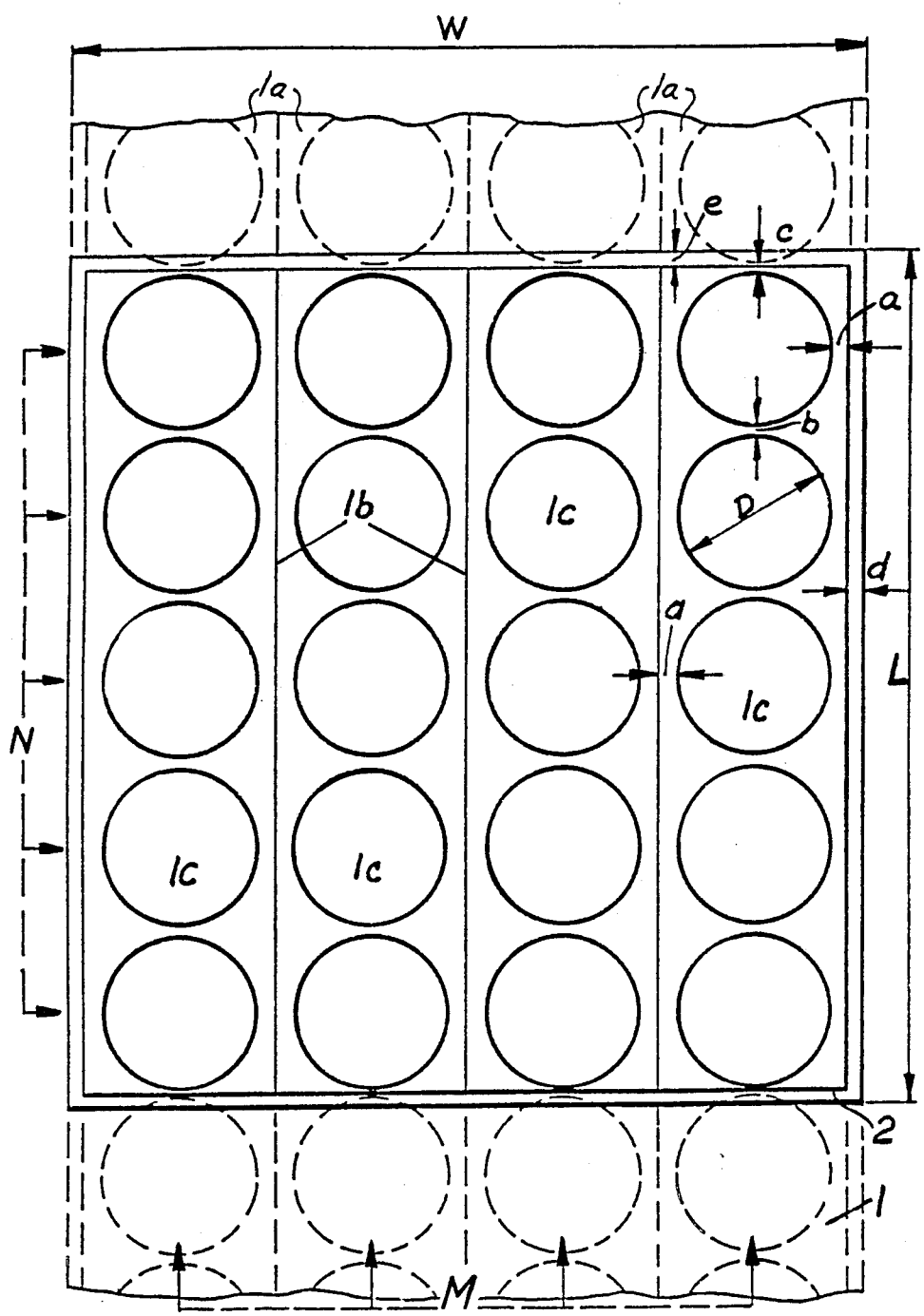
FIG. 1 is a plan view of a wide web, straight slit, or wide sheet, slit with single row narrow webs or strips according to known art and practice.

FIG. 1 shows a prior art layout of a wide web or sheet 1, which has been slit into strips 1a to produce straight line edges 1b. The web 1 has a width "W" and is made up of "M" number of strips plus a web width allowance factor "d" on both edges thereof. More specifically, the width dimension of each strip is equal to the sum of the blank diameter "D" of each blank 1c and twice the width of a strip shred "a", or M=D+2a. Thus, the width "W" of the web 1 is equal the number of strips "M" plus the web width allowance factor "d" on each side thereof or W=M (D+2a)+2d.

If this web 1 is cut up into sheets along lines 2 transverse of the longitudinal axis of the web, then normally the sheet length "L" can be calculated as follows:

$$L = N \cdot D + (N-1)b + 2c + 2e,$$

where

N=number of blanks 1c in the length L;
b=longitudinal distance between the cut edges of each blank 1c;
c=distance between the first and last cut edge and the transverse cut line 2 of the strip 1a; and
2e=longitudinal trim allowance.

The material utilization factor "U" in this case is low and governed by a formula:

$$U = \frac{M \cdot N \cdot \pi D^2}{4 \cdot L \cdot W}$$

If, for example, D=200 mm, M=4, N=5, a=1.5 mm, b=1.5 mm, c=1 mm, e=1.5 mm, and d=1.5 mm, then L=1011 mm, W=815 mm and the material utilization factor U is 76.26%.

When the web 1 is slit into four narrow strips 1a, then the material utilization factor will increase to U=76.52%.

Figure 2:
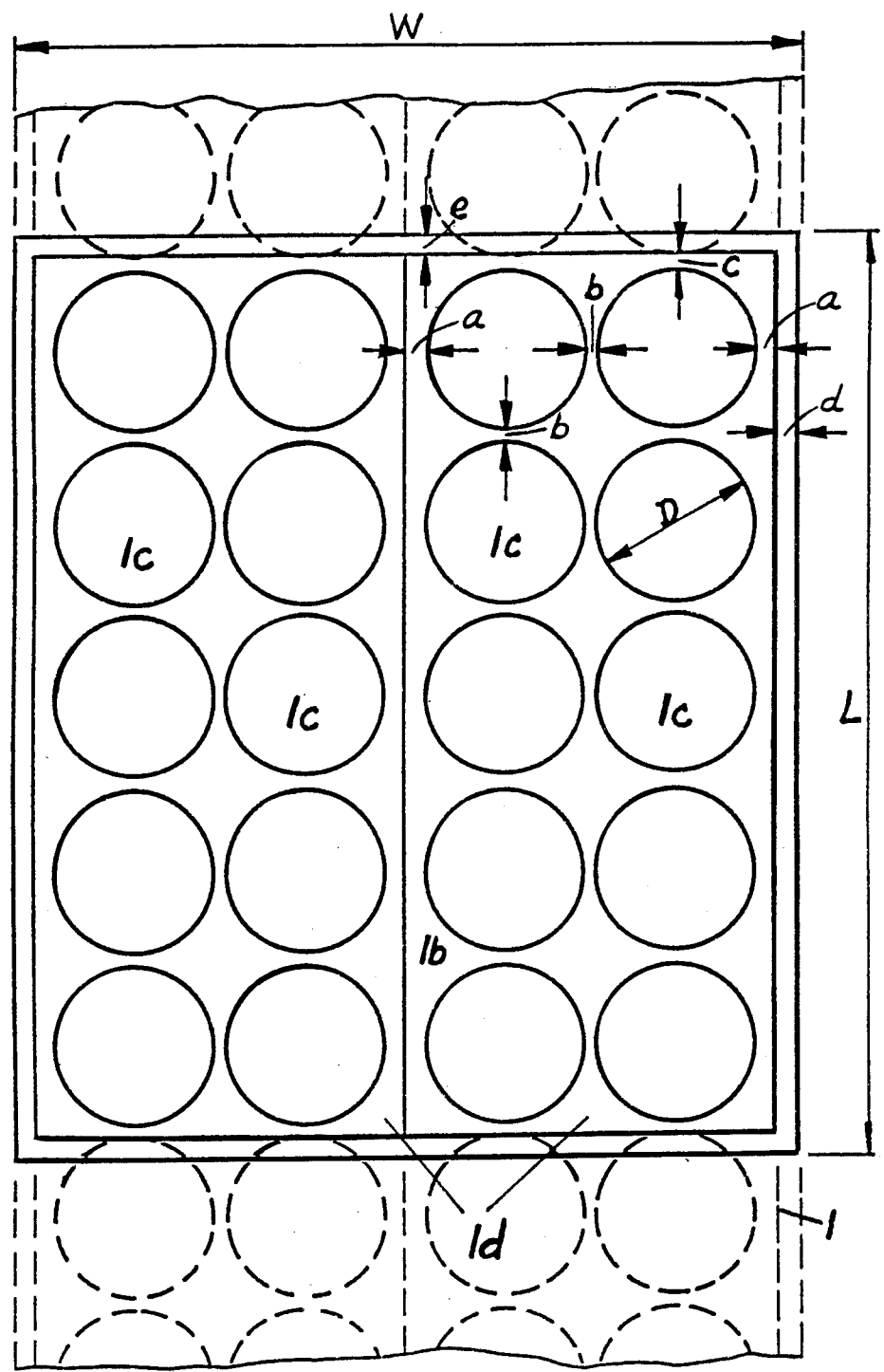
FIG. 2 is a plan view of a wide web, straight slit, or wide sheets, slit into double row narrow webs or strips according to known art and practice.

FIG. 2 illustrates a further prior art sheet layout with two strips 1d, each with a double row of blanks 1c. In this case, the sheet length "L" will be the same as in FIG. 1 but the sheet width "W" will be less since the dimension "a" does not appear between the blanks, namely:

$$L = N \cdot D + (N-1) b + 2c \times 2e = 1011 \text{ mm}$$

$$W = M(D + a + b/2) + 2d = 812 \text{ mm}$$

Thus, the material utilization factor for this sheet is U=76.54% and for the strips 1d U=76.80%.

The improvement in the material utilization factor is marginal compared with single blank row strips 1a of FIG. 1, but even this marginal improvement is worthwhile.

Figure 3A:
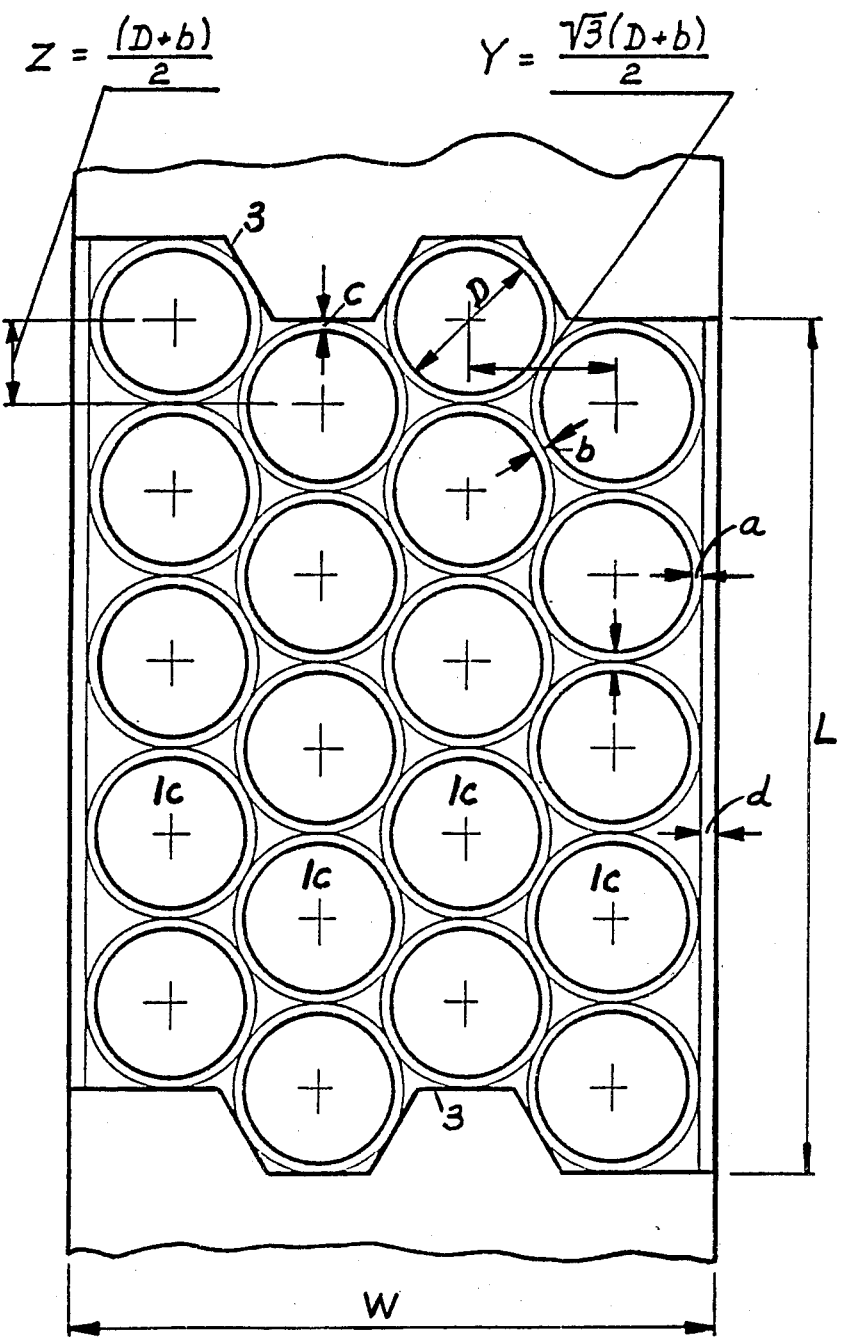
FIG. 3A is a plan view of a wide web or sheets, fully staggered, suitable for multi-die blanking or cupping as used generally for D&I (Draw and Iron) and DRD (Draw-Redraw) cupping and which is also known art and practice.

FIG. 3A illustrates a further and worthwhile prior art arrangement and is regarded as a competitive layout consisting of a fully staggered sheet or web layout. Due to the fully staggered arrangement of the blanks 1c, the distance "Z" between the centers of adjacent staggered arranged blanks 1c, lying each in adjacent blank rows, is $$\frac{(D + b)}{2},$$

and therefore the distance Y between adjacent row center lines $$\frac{\sqrt{3} (D + b)}{2}.$$

If the web is primarily scrolled as by represented by nonstraight transverse scroll lines 3, then its sheet length is as follows.

$$L = ND + (N-1) b + 2c$$

The coil web and sheet width dimensions are identical, namely:

$$W = (M-1)\sqrt{3}(d + b)/2 + 2a + 2d + D$$

If, for example, N=5, M=4, D=200 mm, a=1.5 mm, b=1.5 mm and c=1 mm, then L=1008 mm and W=729.5 mm.

In this embodiment, the material utilization factor for the primary scroll is U=85.45%.

In the case of coiled material, the utilization factor increases to U=85.49%, which is a minimal increase, but the primary scroll operation is omitted. Coil is used for all D&I (Draw and Iron) operations, whereas the primarily scroll sheets are essential for DRD (Draw-Redraw) can making, which requires surface coating by using sheet coating equipment already in existence and widely used by can makers.

Figure 3B:
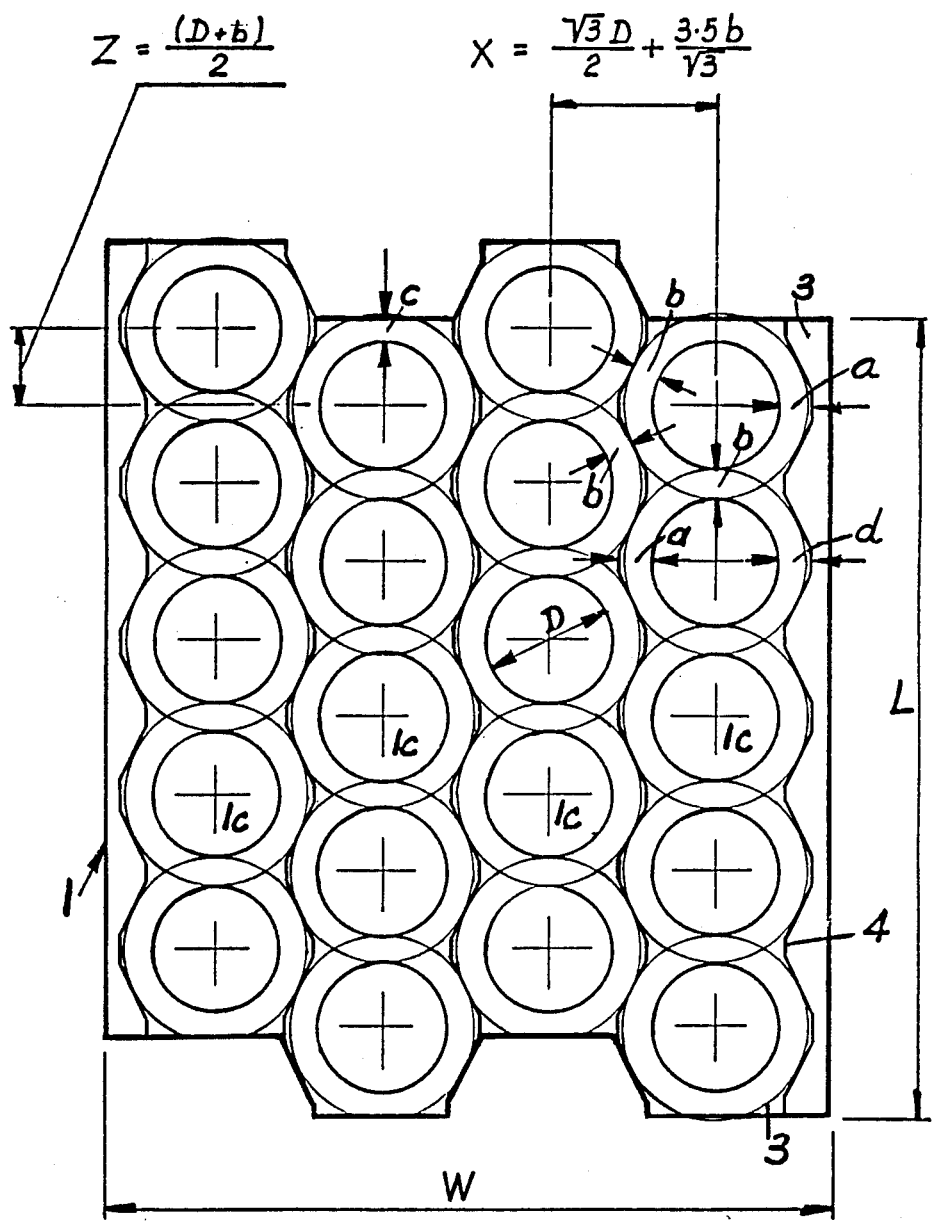
FIG. 3B is a plan view of a wide sheet primarily and secondarily scrolled to provide single row staggered strips in accordance with known art and practice.

FIG. 3B illustrates a further prior art sheet layout for primarily scrolled and secondarily scrolled sheet to produce single row strips. This sheet layout shows the transverse nonstraight scroll lines 3 according to the embodiment of FIG. 3A and is further provided with longitudinal nonstraight scroll lines 4, which form the lateral edges of each single row strip. The material having this geometry could be applicable for low output can making.

In this case, the sheet length is as follows:

$$L = ND + (N-1)b + 2c$$

The sheet width can be computed as follows:

$$W = (M-1)X + D + 2a + 2d$$

where $$X = \frac{\sqrt{3} D}{2} + \frac{3.5b}{\sqrt{3}},$$

which is the distance between the center lines of adjacent strips of blanks.

If for example, D=200 mm, M=4, N=5, a=1.5 mm, b=1.5 mm, c=2 mm, d=1.5 mm and X=176.23 mm, then L=1008 mm and the coil width W=734.69 mm. Thus, the material utilization factor is U=84.84%.

Compared with the previous case (FIG. 3A) of a primarily scrolled sheet, the material utilization factor has dropped by 0.61%, but still may be considered acceptable.

Figure 4A:
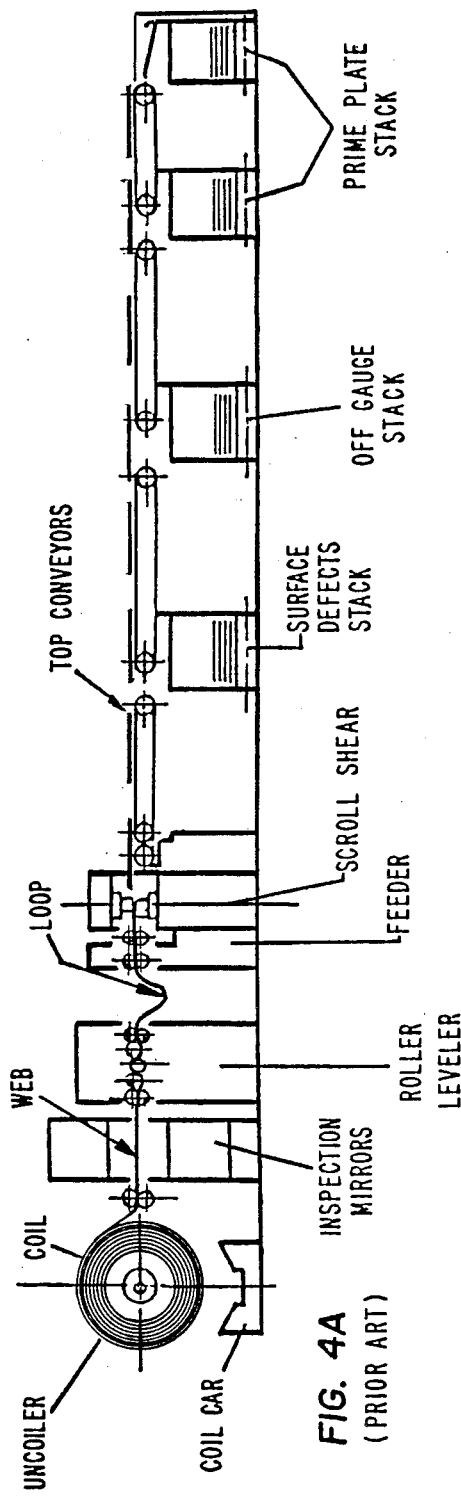
FIG. 4A is a side view of apparatus for effecting a so-called "primary scrolling" of webs into sheets in accordance with known art and practice.
Figure 4B:
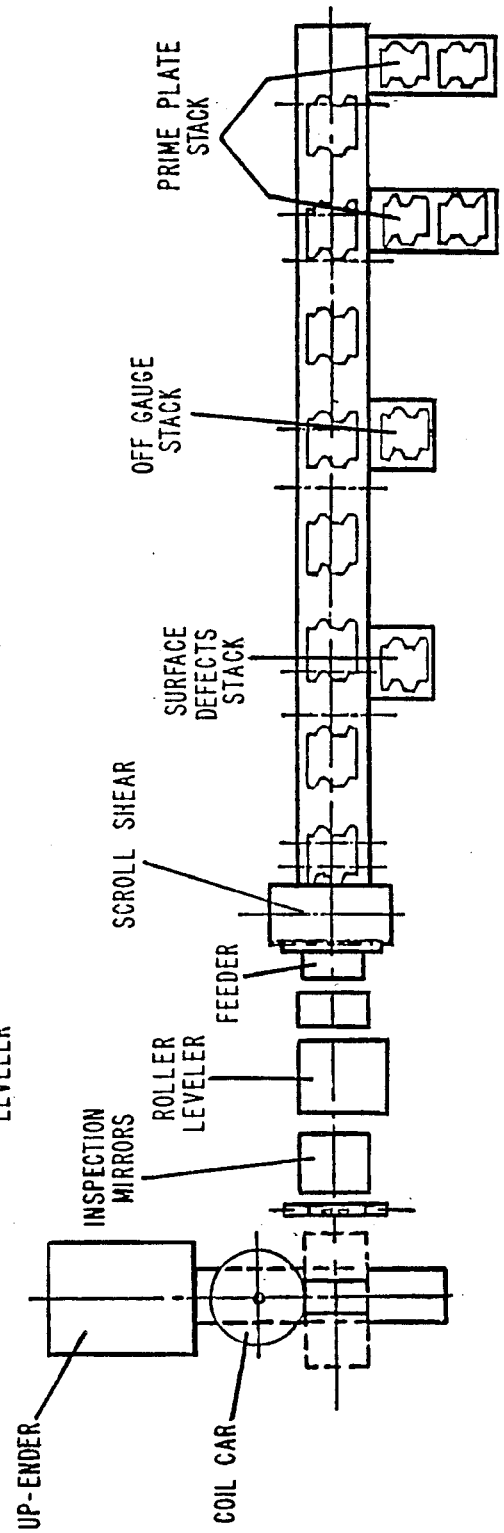
FIG. 4B is a top view of the apparatus illustrated in FIG. 4A.
Figure 4C:
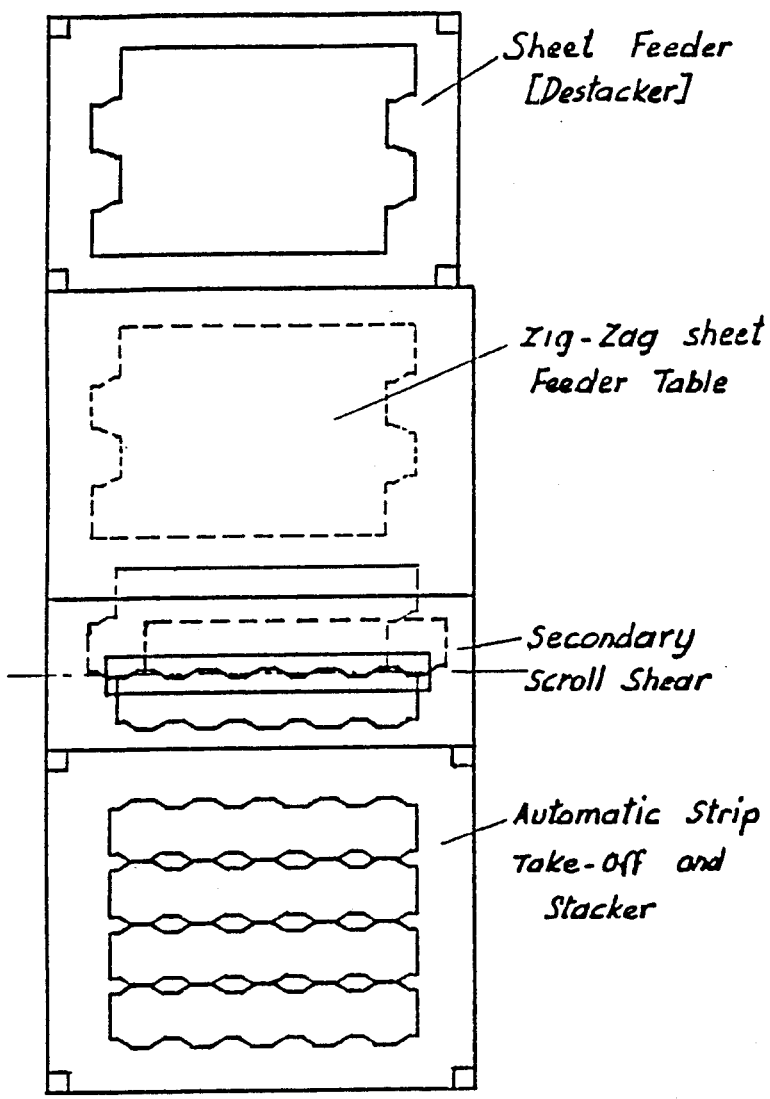
FIG. 4C is a schematic illustration of the subsequent positions of the scrolled sheets and strips during their passage through a secondary scroll shearing line arranged in accordance with known art and practice.

FIGS. 4A, 4B and 4C show the equipment for so-called "primary scrolling" of webs and "secondary scrolling" of sheets to achieve the most efficient material utilization according to present practice, when the ultimate product requires a protective coating, or the conversion equipment is capable of accepting either coated primarily scrolled sheets of single, double or multiple row, secondarily scrolled strips or sheets.

Obviously, the overall economics of the process is influenced not only by the percentage of material utilization, but by capital cost content of the material preparation equipment, cost of running such equipment and the inevitable scrap handling, however small it may be due to additional operations. Hence, the cost of the equipment and process of the existing operations must be compared with those according to the invention in order to establish the feasibility and justification for the longitudinal scrolling operation.

FIGS. 4A and 4B illustrate a coil cutup assembly. The coil is placed on an "up-ender", which changes the attitude of its center line from the vertical to the horizontal orientation and at the same time placing it in a "V" holder of a rotary coil car, which delivers the coil to an expandable mandrel of an uncoiler adapted to correctly uncoil either from the top or from underneath. From the uncoiler, the web of the material passes between two guide rolls into a visual inspection area consisting of two mirrors set at suitable angles to permit viewing of both sides of the web at the same time. The web enters a "roller leveler" (or flattener) which is set up to remove any permanent curvature from the web. From the leveler, the material drops into a loop at a constant linear velocity. A sensing device keeps the mean depth of the loop, from which the material is taken upwards intermittently into a web feeder, and meters precise lengths of the web passing between two scroll dies. The material stops when the dies close. When the dies open, a sheet is taken away by an extract conveyor, while the metering rolls of the feeder feed or advance a precise length of the web between the dies of the scroll shear.

Individual sheets are then conveyed into sheet stacking devices of a classifier, which normally is provided with four stacker boxes. The first two stacker boxes accept sheets with "surface defects" and "off gauge", whereas the third and fourth boxes accept, in turn, the prime quality sheets.

The prime quality sheets are normally provided with suitable surface coating before conversion into products. In the case of high output conversion equipment, whole sheets are fed into multi-die presses. In the case of low output conversion equipment with single tools, the primarily scrolled sheets have to be secondarily scrolled to single row strips as shown in FIG. 3B. To do that, a special secondary scrolling installation is needed, as diagrammatically illustrated in FIG. 4C. A secondary scroll line consists of a destacker, which advances single sheets onto a sheet feeder table, whereby they are moved stepwise by suitable feed bars towards scroll dies operated by a reciprocating press. When single row strips are scrolled, a side movement is needed on the feed table, which results in zig-zag movement of sheets characterized by one pitch forward movement and a half pitch side movement, to correctly present the primarily scrolled sheets precisely to the secondary scroll dies. When a scrolled strip is sheared away, it is placed on a stack by an automatic strip take-off mechanism operating between the scroll shear and the stacker. FIG. 4C does not show the mechanisms involved in the individual machines, but it indicates the subsequent positions of the scrolled sheets and strips during their passage through the secondary scroll shearing line.

To realize savings, both primary and secondary scrolling equipment may be avoided. This is being done overwhelmingly in case of a Drawing and Wall Ironing (D & I) process, which accepts uncoated stock. Obviously, coated coiled material may be fed directly into the conversion equipment if production volume justifies coil coating installations.

For low volume production, where single tool equipment is adequate, a single row scrolled coil would be ideal and could be already applicable for "Mini D+I" installations, whereby no coating is needed. Scrolled single row coils could be produced by modifying the "Edge Trimmer" in the coil preparation line, and also by adapting the recoiling provisions. However, this is one of a number of possibilities. Most probably, a dedicated longitudinal scrolling line may prove most economical, because of high speed potential.

Availability of longitudinally scrolled coils may lead to narrow coil coating developments, thus widening the scope of the present invention. With this in mind, what follows is a discussion of various aspects of the present invention.

Figure 5A:
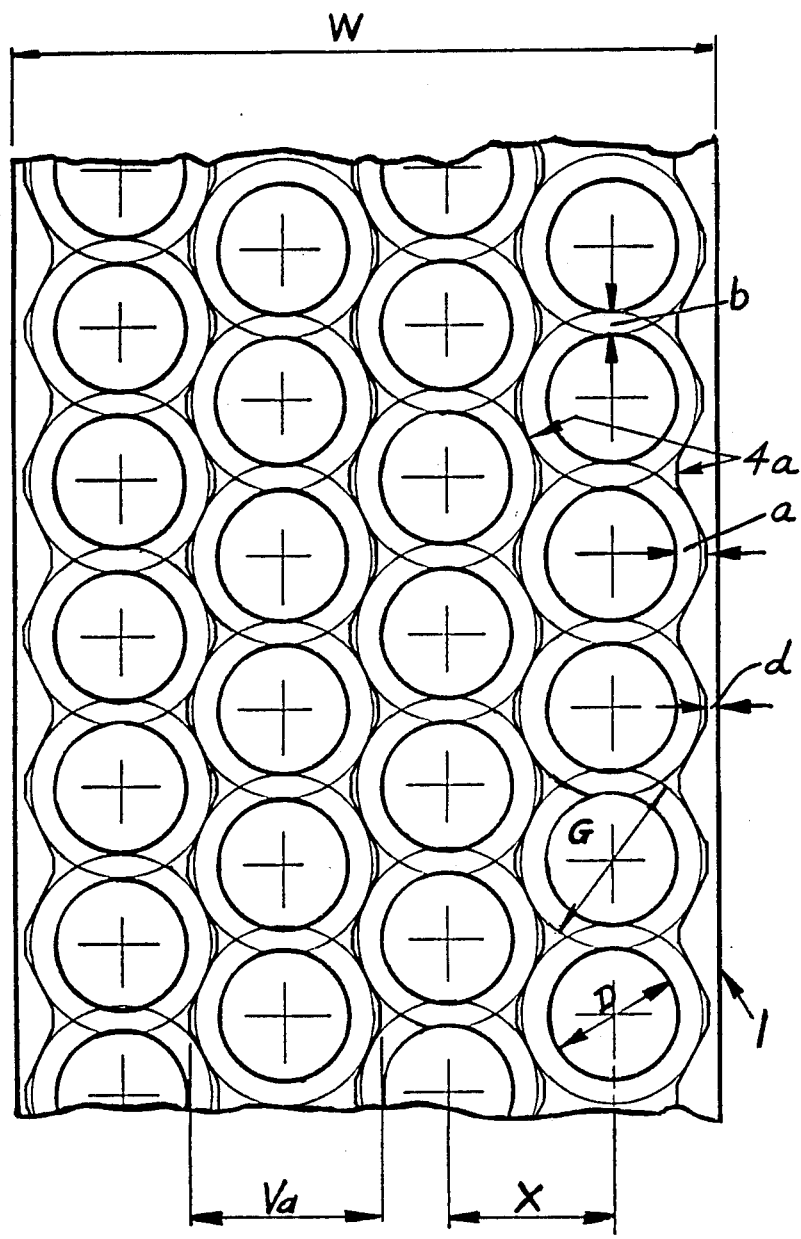
FIG. 5A is a plan view of a wide web longitudinally scroll slit by a method and an apparatus according to one aspect of the present invention.
Figure 5B:
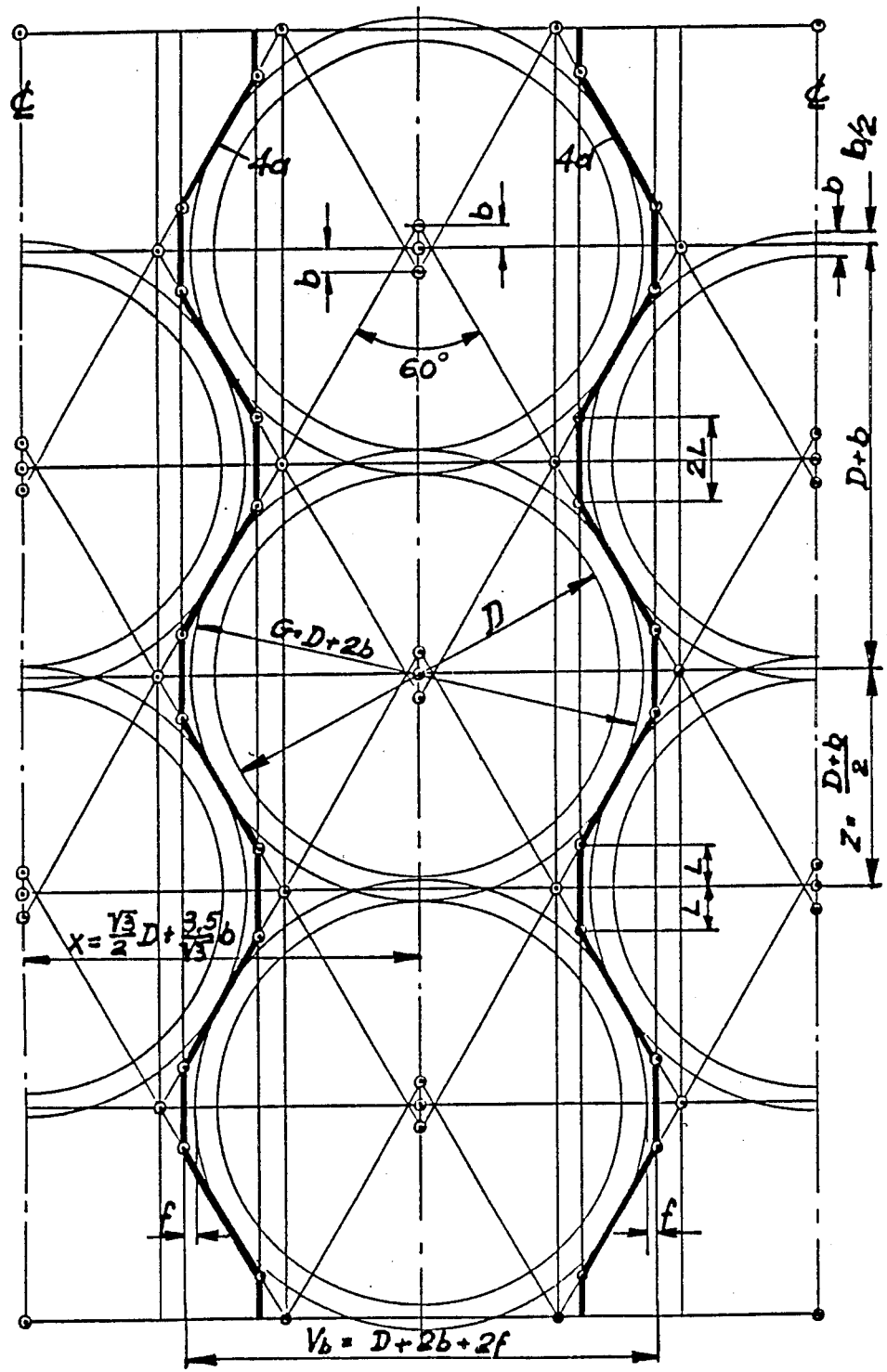
FIG. 5B shows the dimensional relationship of the scroll geometry according to a slight modification of the aspect of the invention shown in FIG. 5A.

FIGS. 5A and 5B illustrate a web layout for a scroll slitting operation carried out in accordance with one aspect of the present invention and utilizing an apparatus constructed in accordance with another aspect of the invention. An identical longitudinal scroll shape is repeated four times in pairs. The geometry is similar to that in FIG. 3B. However, the illustration in FIG. 5A shows how the pattern of the layout has been gradually changed from the illustration on FIG. 3B by taking into consideration a longitudinal scroll line 4a, which, in this embodiment, is tangent to a generating circle of "G" diameter. It can be seen that:

$$G = D + 2b$$

whereby "D" is the blank diameter and "b" is the shred width allowance. It is also evident from FIG. 5A that the scrolled blank row width "$V_a$" is:

$$V_a = D + 2a$$

where "a" is the narrow web width allowance which normally is always greater than the shred width allowance "b". An increase in the dimension "a" is permissible without any detriment to the material utilization factor, since in the middle of the coil the dimension "$V_a$" is independent of the shred dimension "b", and on the extremes at the wide web edges the negative influence is minimal since its increased dimension normally takes some material from the web width allowance dimension "d".

Longitudinally scrolled webs have a slightly improved material utilization factor, which in the embodiment of FIG. 5A is:

$$U = \frac{4 \cdot \pi \cdot 200 \cdot 200}{4 \cdot 201.5 \times 734.69} = 84.88\%$$

assuming that D=200 mm, M=4, N=1, L=201.5 mm, W=734.69 mm. The material utilization factor U therefore is slightly better than in the layout of FIG. 3B.

Although the illustration shows narrow webs having single blank rows, double or multiple blank rows could be obtained by the same method, and the webs thus obtained would be suitable for blanking, leaving a shred.

In the more detailed fragmentary illustration of FIG. 5B, the nonstraight longitudinal scroll lines 4a have scroll line sections parallel to the longitudinal axis of the blank rows and at a distance "f" parallel to the tangent of the generating circle of "G" diameter. Suitable values for the distance "f" can be selected according to practical requirements. An example for an assumed value of the distance "f" will be given in context with the description of a further embodiment illustrated in FIGS. 8A and 8B.

As shown in FIG. 5B, the width "$V_b$" of a scrolled blank row is calculated as follows:

$$V_b = D + 2b + 2f$$

The length "2(L)" of the scroll line sections parallel to the longitudinal axis of the blank rows can be calculated with the help of the geometrical relations given in FIG. 5B. An exemplary calculation is also specified in connection with FIGS. 8A and 8B.

FIG. 5C shows a typical can end component 110 stamped from this material. In this case it is of circular shape surrounded by a seaming panel 111, which in the can closing operation interlocks with the can body component. The center of the end component is normally depressed and suitably shaped, and referred to as countersink panel 112. According to present practice, the end component 110 is made in one operation using a suitable combination tool, which first blanks a circular disc and then draws the seaming panel 111 and forms the countersink panel 112, the starting material being single row or double row scrolled strips obtained by a system shown in FIG. 4C producing the strips illustrated in FIG. 3B.

FIG. 5D shows a double row longitudinally scrolled web 113 made from a wide web material similar to that illustrated in FIG. 5A, except that the web of FIG. 5A has been slit into single row webs. The double row web 113 can be fed into a standard double die end stamping press, which would normally accept double scrolled strips from a stack magazine, or from a coil placed on a simple uncoiling arrangement in a form of a rotating table placed on the floor, such set-up being well known for uncoiling wire and narrow webs from large coils. In order to transport the longitudinally scrolled web through the end stamping press, the existing feed bar arrangement can be modified for the feed fingers to engage in the scrolled shape. Alternatively a new feeding arrangement could be devised as well as a skeleton cutting guillotine.

Application of the longitudinally scrolled webs in end making offers substantial labor savings. The new can end making equipment may be cheaper and more efficient as any risk of stoppages caused by scrolled strip handling have been avoided.

Figure 6A:
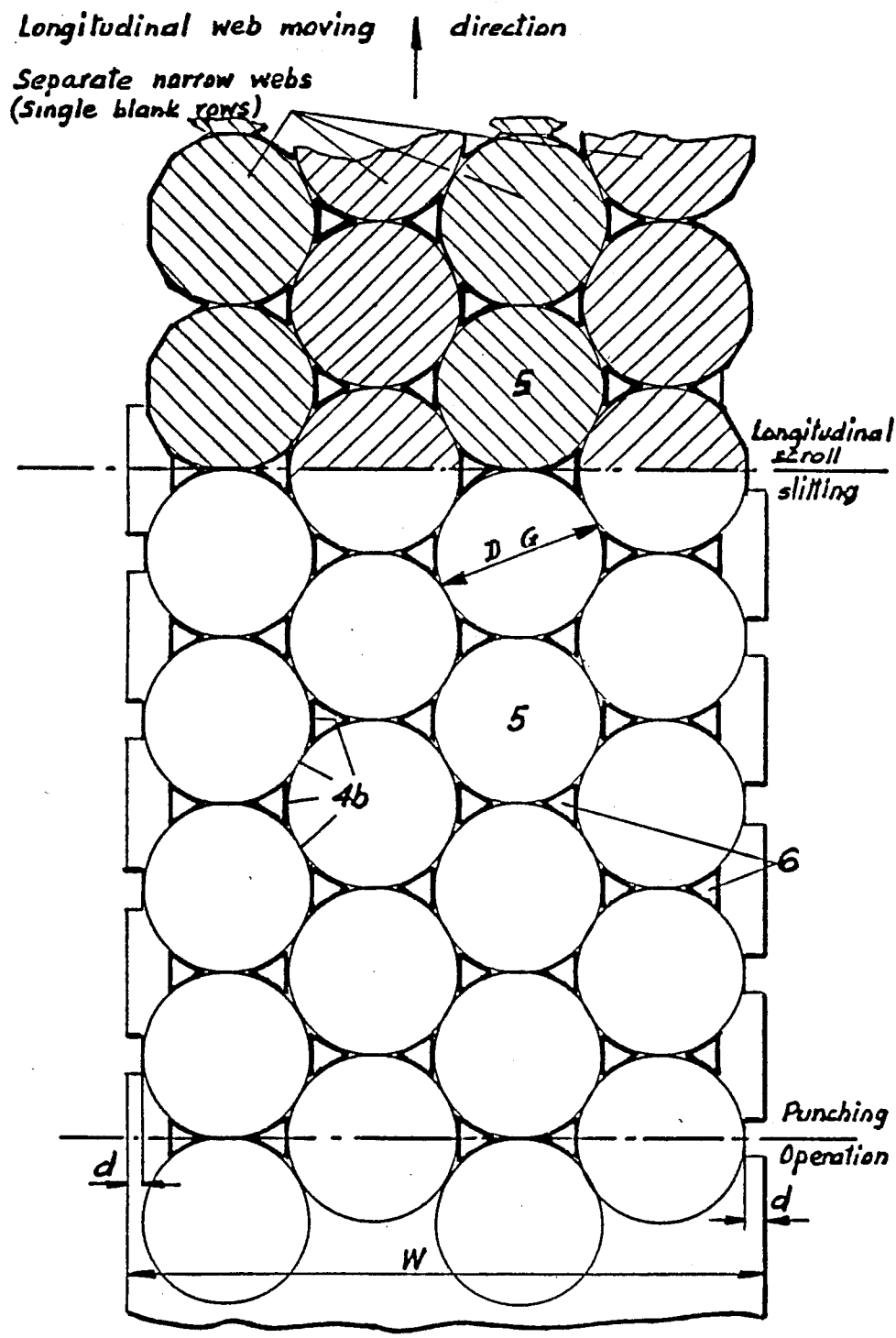
FIG. 6A is a plan view of a wide web longitudinally scroll slit combined with punched triangular holes according to another aspect of the invention to produce twelve-sided blanks.

FIG. 6A illustrates the layout of a wide web, whereby the longitudinal scroll slitting along scroll slitting lines 4b follows a triangular hole punching operation which punches out equilateral triangles 6 in order to provide twelve-sided blanks 5. It can be seen that the sides of the blanks are tangent to the generating circle of "G" diameter, which in this embodiment coincides with the calculated blank diameter "D". Hence, in effect, there is no shred which results in a material savings reflected in a narrower coil required for the same cut edge diameter as for the example of FIG. 3B.

Web width therefore is $W = (M-1)\sqrt{3}D/2 + D + 2d$.

If, for example, D=200 mm, M=4 and d=1.5 mm, the coil width W equals 722.62 mm.

The material utilization improves because of the narrower coil. That is, $$U = \frac{4 \cdot \pi \cdot 200 \cdot 200}{4 \cdot 200 \cdot 722.62} = 86.95\%.$$

Over 2.8% material gain has been achieved by employing the method and the slitting apparatus according to this aspect of the invention.

Figure 6B:
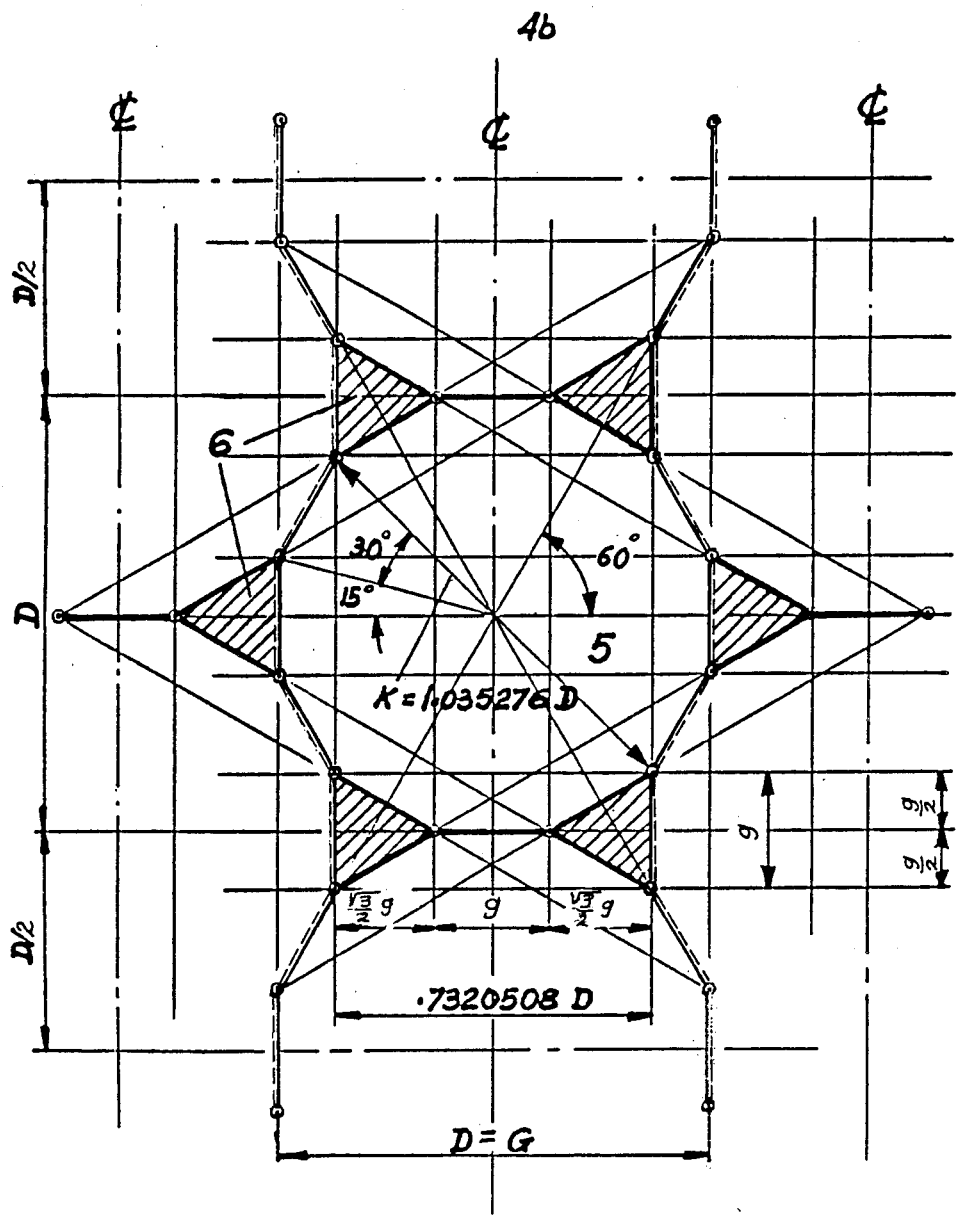
FIG. 6B is a plan view of a fragment of the web showing the dimensional relationship of the scroll geometry of a twelve-sided blank with triangular shaped material segments still attached thereto.

As shown in detail in FIG. 6B, the material punched out (hatched triangles or V-shaped notches 6) of the material of the web is shaped in an equilateral triangle form and has side lengths "g" equal to D.tan 15°=0.267949D and the dimension "K" across the peaks of the symmetrical twelve-sided blanks is 1.035276D, it being understood that such an increase over the value "D" should not cause problems during the conversion of the blanks to cups.

FIG. 6C shows a cross-section of a typical easy open end component 114 for beverage cans, which is characterized by a so called "key hole" score line 115 and a tab 116 attached to a centrally located rivet 117. Such an end component is normally made in a number of operations, starting with end shell making in a standard end making press, and then converting the shell to include the easy opening features in a separate press complex which also makes the tabs before attaching them onto the ends.

FIG. 6D shows diagrammatically a progression of operations necessary to produce easy open ends from longitudinally scrolled webs according to the invention, as illustrated in FIG. 6A.

In this case, the web is fed from a coil into a simplified conversion press, which retains the standard tool making facility, but the end shell handling arrangement is replaced by the scrolled web itself. The conversion operations into easy open features are performed on the web itself. Finally, when the tab is attached, the shell is made in a last operation as shown in FIG. 6C.

Benefits arising from the system as shown in FIG. 6D are obvious. One may save equipment for end shell making and a great deal of handling arrangements for end shells prior to conversion into easy open ends. Furthermore, the conversion equipment employing the scrolled web may be run at higher speeds.

FIG. 6E shows a fragment of the scrolled web according to the invention as illustrated in FIG. 6A. In this case, by suitable cropping of the web along a shortest possible cross line 119, equilateral dodecagon blanks can be obtained. These dodecagon blanks are then converted into can bodies in a drawing and wall ironing tool as shown in FIG. 6F.

With reference to FIGS. 6E and 6F, the web is fed into the drawing tool having a punch 121 and a blankholder 118 provided with a cropping edge on one side, which cooperates with the corresponding cropping edge attached to a draw die 120. After detaching one blank from the web, the blank is clamped between the blankholder 118 and the draw die 120. This is followed by a punch 121 contacting the blank and drawing it through the draw die 120 to produce a cup. Subsequent travel through three ironing rings 122, 123, 124 of decreasing internal diameters reduce the cup wall thickness, thus increasing its height.

Due to the dodecagon shape, the edge of the wall ironed can has a regular saw tooth-like shape. The can stripping device may be modified suitably to cater for this shape.

Application of the dodecagon blanks in wall ironing might be found economically attractive by avoiding the shred in the material skeleton, thus gaining savings.

FIGS. 7A–7F illustrate the effect of the material anisotropy on the height of the cup drawn from ferrous materials using circular and noncircular blanks.

Figure 7A:
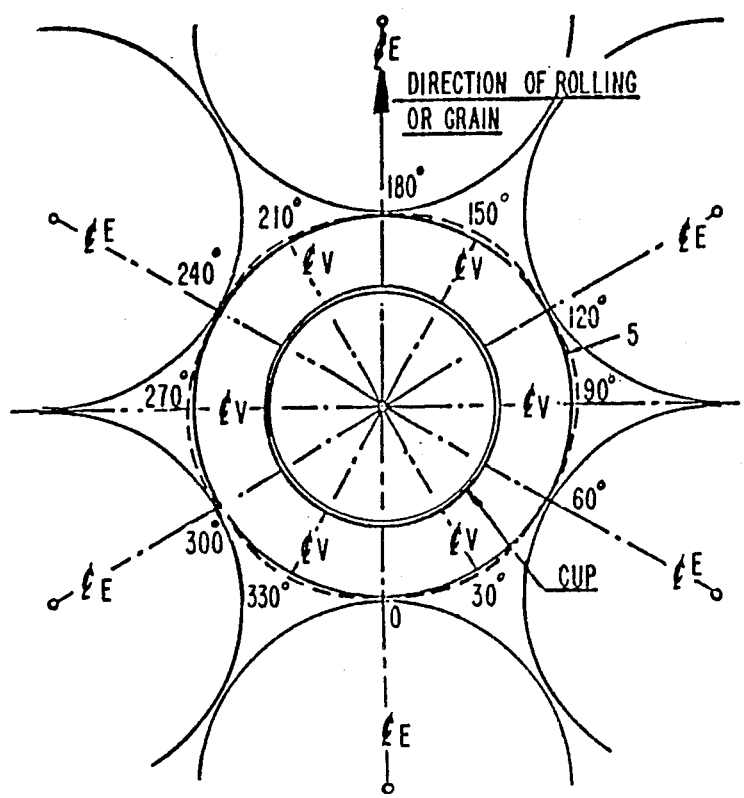
FIGS. 7A–7F show the effect of material anisotropy on the height of the cup drawn particularly from ferrous materials using circular and noncircular blanks.

In FIG. 7A, a plan view of a circular blank 5 is shown in relation to the rolling or grain direction and also in relation to other blanks, assuming the most economic layout of a 60° pattern. The diagram indicates the positions of potential ears which normally occur on a line coinciding with the direction of rolling and at positions of 60° from the directions of rolling. Between the ears there are positions of valleys shown at 30°, 90°, 150°, 210° and 330°. A second smaller concentric circle on FIGS. 7A denotes the cup F of a diameter equal to about 60% of the blank diameter. This means that 20% of the blank diameter, is making up the cup height, which, assuming the retention of constant material thickness after cupping, should be ideally 27% of blank diameter made from totally isotropic material.

Figure 7B:
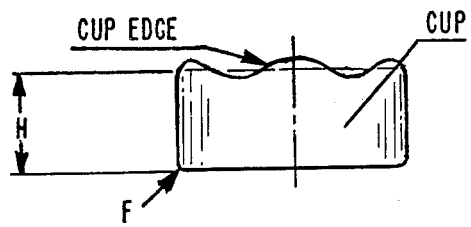
Figure 7C:
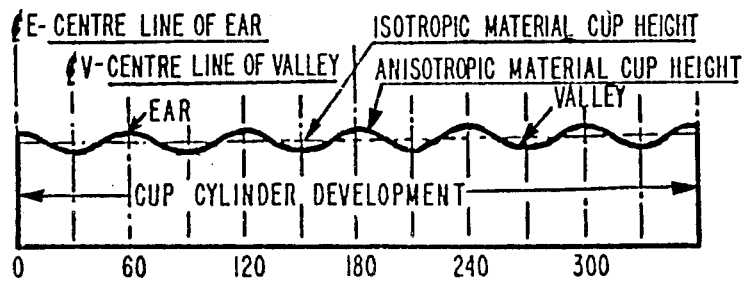

FIG. 7B illustrates an elevation of the cup in which "H" denotes the ideal cup height. The actual cup edge is far from a straight line in this view. To illustrate the effect of anisotropy, the development of the cup wall is shown in FIG. 7C, which indicates clearly the positions of the ears, at 0°, 60°, 120°, 180°, 240° and at 300°, at which points the cup height is greater than the ideal height "H". At locations between the ears, the cup height is lower than the ideal height "H" by an amount depending on the degree of anisotropy.

As shown in FIG. 7A, the ears are located at positions where the generating circles are tangent, or at positions of least shred between the cut edges. The valleys, on the other hand, are adjacent to the triangular areas, which are normally scrapped as part of the shred skeleton. This observation points towards the proposal that noncircular blanks might be beneficial in increasing material utilization. Experiments confirmed that about 2.5% difference in blank diameter at positions of valleys to compensate for the effect of earing, produced cups of more even height. However, taking advantage of this observation might not be practicable in producing blanks for subsequent use, but it could be applicable when cupping is executed from the web. In FIG. 7A, the idea of compensation for earing has been indicated by dotted lines. The benefit is obvious, as it might offer a material saving of an order of 2.5% compared with a circular blank.

Figure 7D:
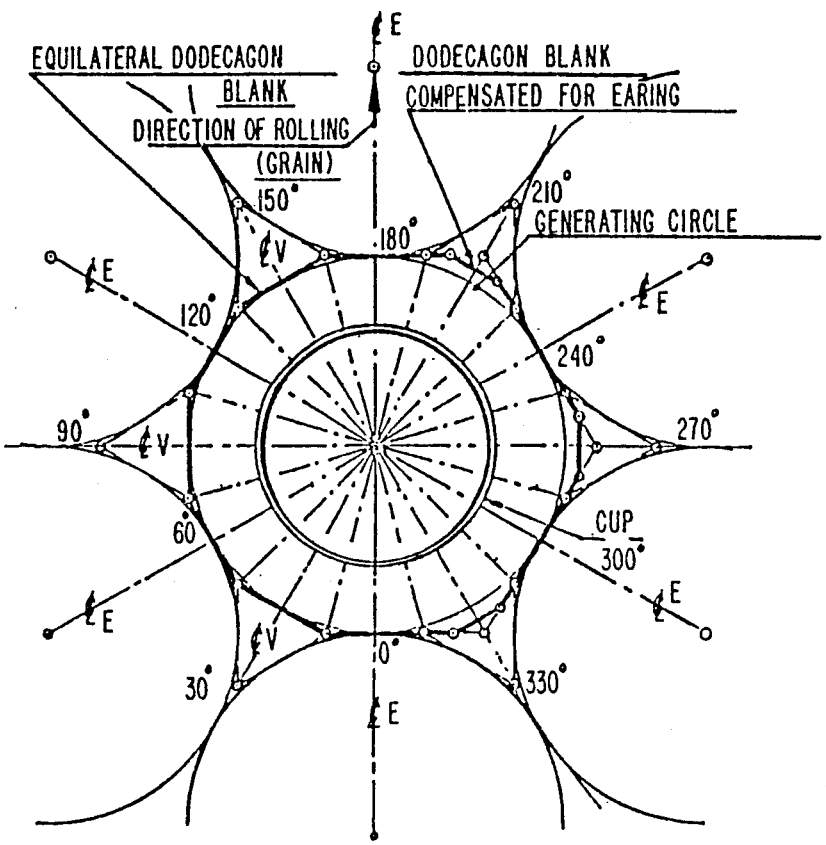
Figure 7E:
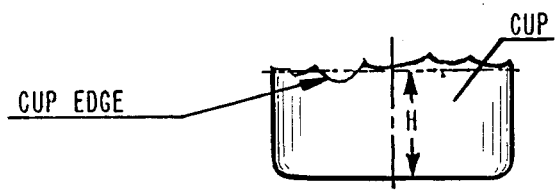
Figure 7F:
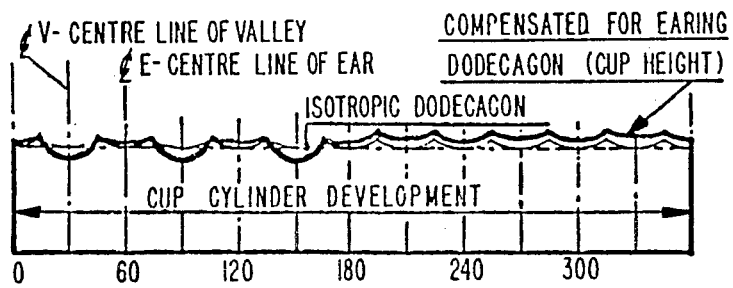

FIGS. 7D, 7E and 7F illustrate how twelve-sided or dodecagon blanks can be modified to compensate for earing, the main advantage being the elimination of shred between the blanks to thereby save about 1% of the material, compared with circular blanks. The lefthand side of FIGS. 7D, 7E and 7F shows the effect of an equilateral dodecagon on the cup height, which manifests itself in twelve sharp peaks around the edge of the cup. The cup height in the valleys between the peaks would be equal to "H" which is the height characteristic of ideal isotropic material. The influence of anisotropy manifests itself in deeper valleys at positions of 30°, 90°, 150°, etc. below the line of ideal height "H", whereas at positions 0°, 60°, 120°, etc. corresponding to ear positions the valleys' depth decreases well above the "H" line. There is a direct comparison here with circular blank with superimposed effect of peaks caused by the dodecagon shape.

The right-hand side of FIGS. 7D, 7E and 7F shows the effect of correction of the blank shape to eradicate the effect of anisotropy. At the positions of the valleys, the sides of the dodecagon are not tangent any more to the generating circle of "D" diameter. These particular sides become therefore shorter, and the sides opposite the potential ears become longer. It is possible to balance the lengths of the modified dodecagon sides in such a way that the cup height over all twelve valleys in the cup edge will be equal. This new height will be greater than the ideal "H" characteristic for isotropic material, and of course similar to that of the corrected circular blank of "D" diameter generating circle.

The benefits of the modified dodecagon are obvious, primarily due to the possibility of utilizing the scrap material in the shred skeleton.

In the extreme case, the dodecagon becomes a hexagon, which uses up all the triangular area between blanks. Unfortunately, the side trim of the web increases and any potential economic advantage offered by hexagonal blanks would be lost.

Figure 8A:
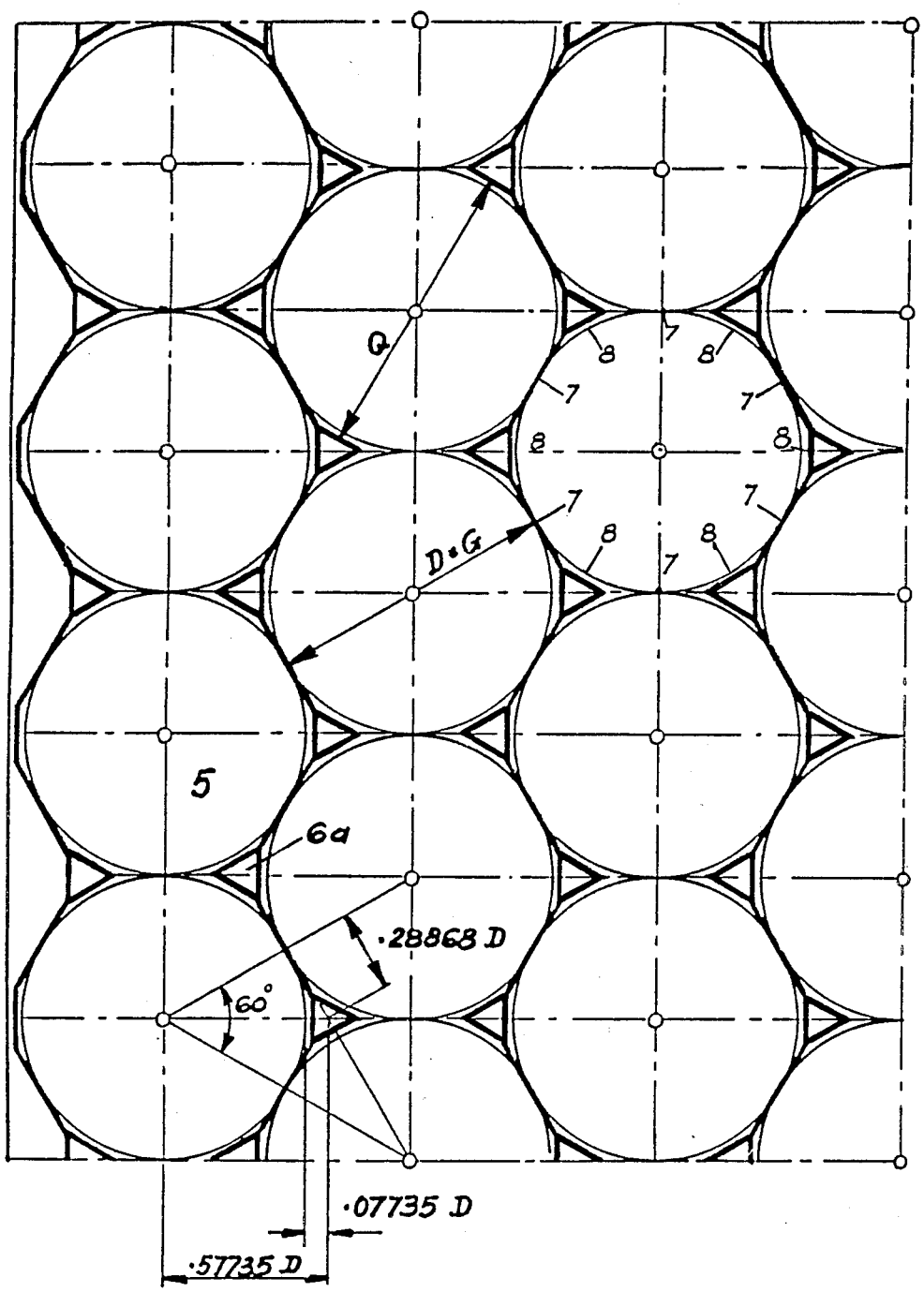
FIG. 8A is a plan view of a twelve-sided blank pattern selected to compensate for the effect of anisotropy of material according to a further aspect of the invention.

FIG. 8A shows how the effect of anisotropy may be compensated for and how more material area may be made available for cupping. The twelve-sided blank layout in a 60° configuration ideally satisfies the conditions according to this aspect of the invention. More particularly, the effect of anisotropy may be compensated for by making the triangular punched holes 6a smaller than calculated in FIGS. 6A and 6B in which the twelve-sided blank 5 is equilateral. Once the triangular holes 6a are made smaller, then the blank ceases to be equilateral. It is a simple routine calculation to determine the decreased size of the triangular hole. This will depend entirely on the difference: Q−D; Q being the increased dimension of the blank at the localities where valleys 8 are expected between the ears 7.

Figure 8B:
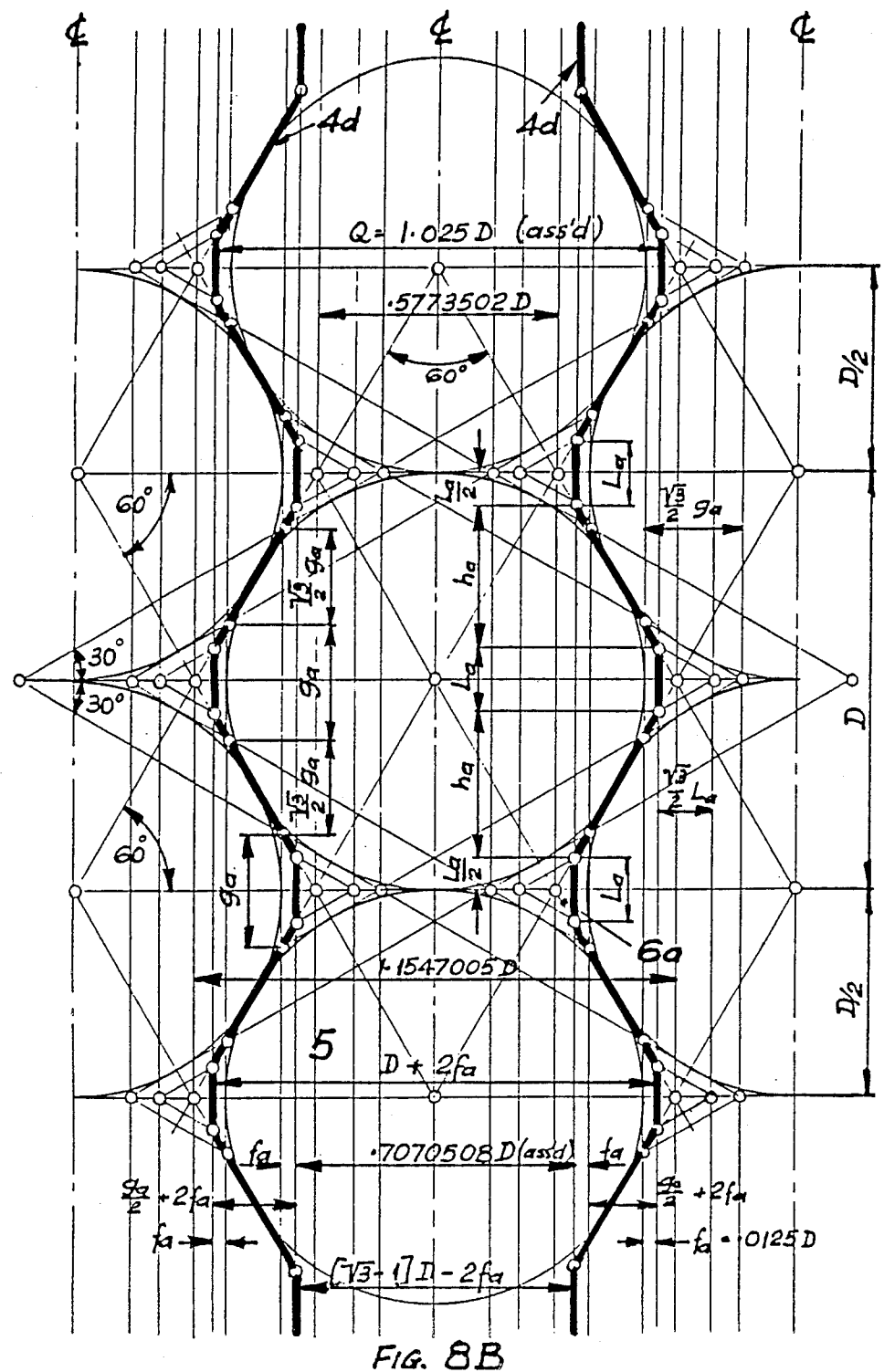
FIG. 8B is a plan view on an enlarged fragment of the layout of FIG. 8A showing the dimensional relationship of the scroll geometry in detail.

In FIG. 8B, the dimensional relationship between the blanks 5, the longitudinal scroll lines 4d to be slit and the triangular holes 6a to be punched out are shown in more detail than in FIG. 8A.

As an example of illustration in FIGS. 8A and 8B, it is assumed that Q is 2.5% greater than D. This means Q=1.025D. Therefore, with the help of the formula $f_a = \frac{1}{2}(Q-D)$, the allowance $f_a$ (as shown in FIG. 8B) can be calculated as follows: $f_a = 0.0125D$.

Because the length ga of the full side of the 60° triangle, which is greater than the one to be punched out is $$g_a = (2-\sqrt{3})D = 0.2679492D,$$

the decreased side $L_a$ of the triangle 6a can be expressed as follows:

$$L_a = g_a - 2f_a \cdot \sqrt{3} = 0.2246D$$

Further, the increased side dimension $h_a$ taken from the obliqued section of the scroll line 4d which is tangent to the blank diameter D can be calculated:

$$h_a + g_a + 2f_a \cdot \sqrt{3} - g_a(2-\sqrt{3})/2.$$

It can be shown that when Q=D, then $L_a$ becomes the length of the side of a twelve-sided polygon, i.e., 0.267949D, which is also ga, the side length of the equilateral triangle. In an extreme case, the whole area of this triangle is available for the blank area, and the blank becomes a hexagon, the side of which is 0.57735D.

The area of the twelve-sided polygon is as follows:

$$A_{12} = 0.267949D \cdot D/4 \cdot 12 = 0.803847D^2$$

which is smaller than that of a hexagon, namely, $$A_6 = 0.57735D \cdot D/4 \cdot 6 = 0.866025D^2$$

and both are higher than an area of a circle $$A_{circle} = 0.785398D^2$$

The ratio of dodecagon area to the area of a circle is 1.02349, which is 2.3% greater. The area gained by compensating for earing can be expressed as follows:

$$A_X = L_a(0.07735D = 0.0125D) = 0.0030789D^2 \text{ per one triangle.}$$

Hence, the total area is six times greater.

$$A_{X6} = 0.01847D^2$$

Hence, the increased area of the dodecagon can be expressed as follows:

$$A_{dodeca} = 0.803847D^2 + 0.01847D^2 = 0.822317D^2$$

The ratio of increased dodecagon area to the area of the circle is $$R_i = \frac{.822317D^2}{.785398D^2} = 1.047, \text{ which is 4.7\% greater.}$$

The ratio of an increased dodecagon to an equal sided one is $$R = \frac{.822317}{.803847} = 1.023, \text{ which is 2.3\% greater.}$$

(These calculated values arise also from the assumption that "Q"=1.025D, leading to the allowance of $f_a = 0.0125D$.

Such a combination appears to increase the material available for forming the container by 2.3%, which would mean that for a given container the blank area could be 2.3% smaller.

Figure 9:
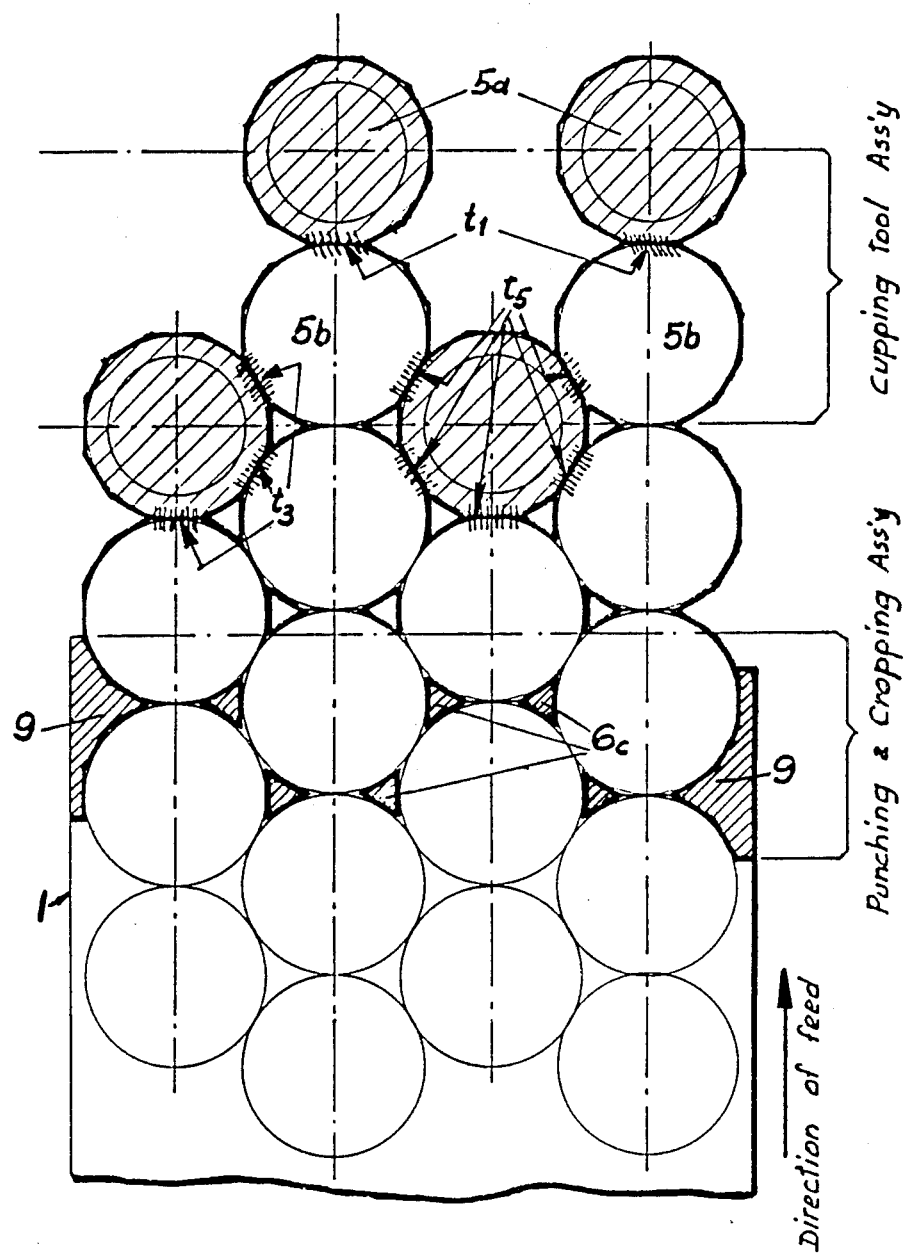
FIG. 9 is a layout view of a wide web according to yet another aspect of the invention, whereby triangular-shaped holes are punched in the web prior to cupping followed by a cupping from twelve-sided blanks in a multi-die tool actuated by a reciprocating press.

FIG. 9 shows how the concept of a twelve-sided blank can be extended to standard cupping operations.

The blank holder shape has to be modified to suit the polygonal shape, and likewise the blanking or cropping dies. The cupping tools must be preceded by a double row of triangular hole punching tools. Likewise web edges have to be trimmed and triangles of material between two blanks have to be cropped away. It can be seen from FIG. 9 that the leading blanks 5A on the web 1 need to be cropped along one side $t_1$ of the blank polygon, whereas the second row of blanks 5b is cut a maximum of five times $t_5$ and a minimum of three times $t_3$ depending on whether the blank 5b is in the middle of the web 1 or at its edge.

The punching and cropping assembly, which is only schematically indicated in FIG. 9, serves to punch out the triangular material sections 6c between the blank rows and to crop the outer edge shred 9 of the wide web 1. Both the triangular sections 6c and the outer edge shred 9 are marked as hatched sections in FIG. 9.

Present practice standard cupper tools are followed by a shred cutting guillotine, which is attached to a die bolster (not shown). In the arrangement according to this aspect of the invention, the punching and cropping assembly may be attached to the front of the die bolsters, without any need for an additional actuating mechanism. This also means that a scrap conveyor can be placed in front of the press, and therefore the back of the press is kept free for the conveying of cups, which is an additional advantage.

Figure 10A:
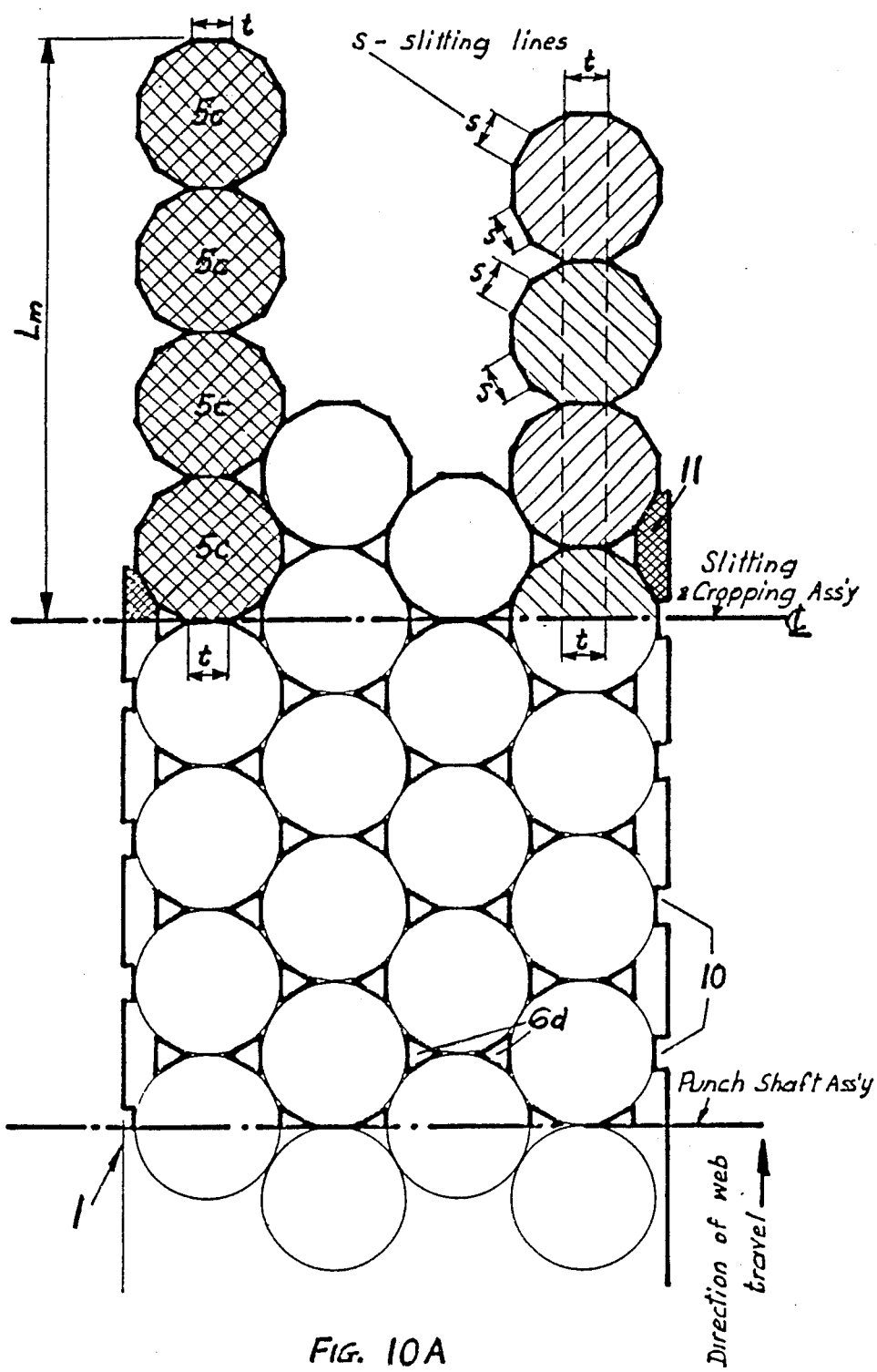
FIG. 10A is a plan view of a wide web according to a still further aspect of the invention, whereby longitudinal scroll slitting is combined with a cutting up across the web to produce double scrolled sheets, strips or twelve-sided blanks.

FIG. 10A illustrates a web layout according to another aspect of the invention. FIG. 10A has some similarities with FIG. 6A. Basically, in the direction of feed of the web 1, there is first provided a punch shaft assembly to blank-out triangular holes 6d in the side strips of the blank rows. The size of these triangular holes will depend on the decision whether to compensate for the anisotropy of the material (as described on the basis of FIG. 6B), and it will be less than the maximum characteristic dimension of the twelve-sided polygon of $g_a = 0.268D$, whereby $g_a$ is the length of the sides of the triangle. The length of the side of an equilateral triangle could well be reduced to half length of the equilateral dodecagon. The thus-perforated web 1 proceeds then into a slitting and cropping assembly, which compared with that in FIG. 6A (longitudinal scroll slitting only), has an additional capability of cutting across the scroll-sided web to produce either multiblank strips "$L_m$" containing a small number of blanks 5c, most probably greater than 2, or individual twelve-sided blanks 5d. Hence the slitting dies of the slitting and cropping assembly will cut along lines "s", the lengths of which will be greater than $g_a = 0.268D$, and the respective cropping dies will cut along lines "t", which will be greater than $g_a=0.268D$, depending on the degrees of compensation for anisotropy.

The punch shaft assembly also removes fragments 10 of the material from the edges of the web 1. This enables the slitting assembly to remove unwanted offcuts 11 from the edges of the web, thus offering complete uniformity of narrow webs, strips or blanks, not depending on whether they are taken from the middle or the edges of the wide web 1.

It will be seen that there are a number of benefits arising from the presence of triangular holes in the coil prior to slitting along lines inclined at an angle of between 0° and 90° to the direction of web travel. These benefits are primarily associated with tool making. Also, the presence of the triangular holes 6d enables cutting across, or cropping off a length of web, to produce strips and/or blanks with greater ease. The triangular holes also serve the purpose of aligning the coil precisely in relation to the slitting and cropping dies, since the ability to cut and slit with precision is the basis for this aspect of the invention.

Figure 10B:
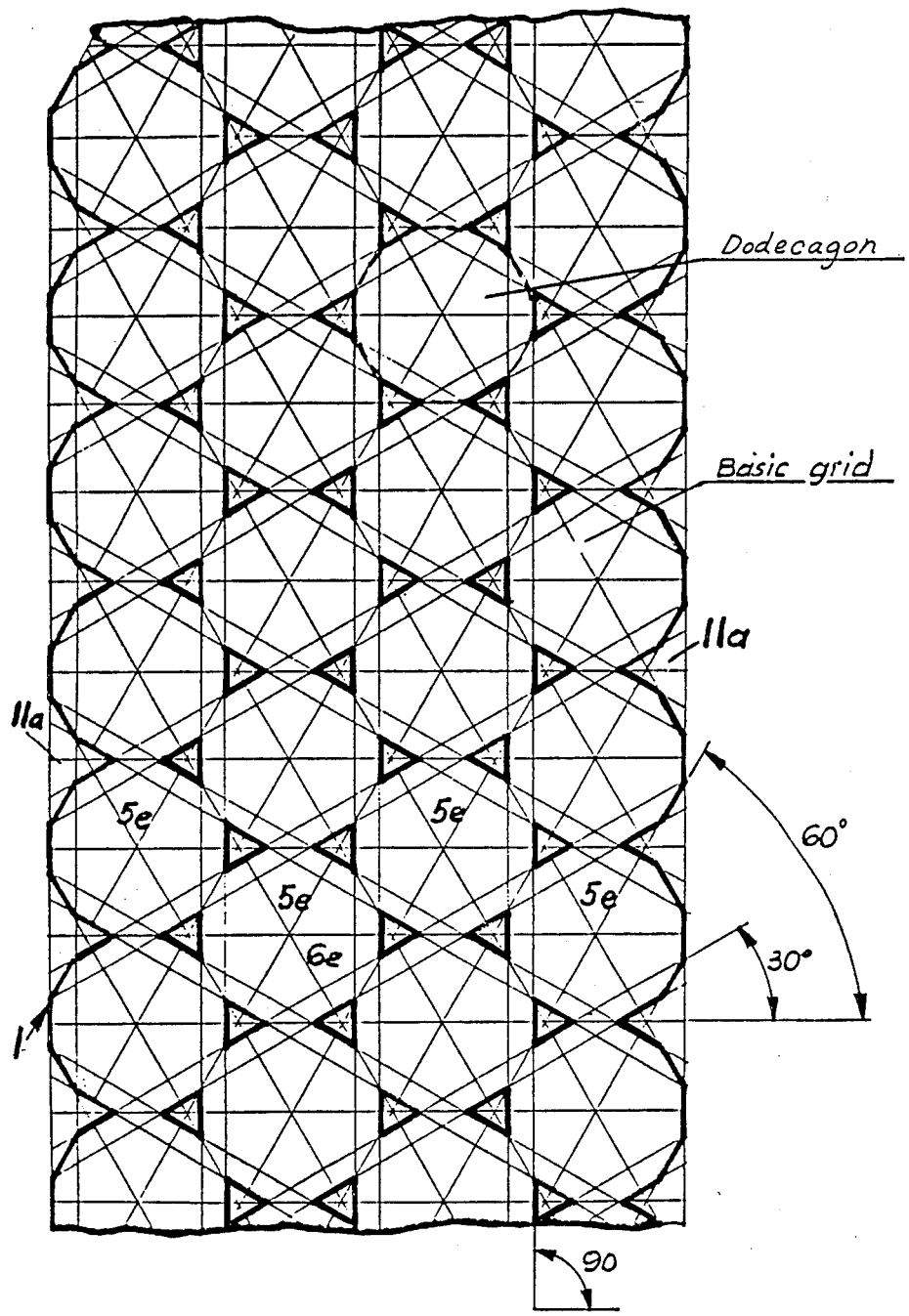
FIG. 10B is a diagram of a perforated and side-trimmed section of a web according to another aspect of the invention.

FIG. 10B shows a diagram of the perforated and side-trimmed section of a web 1 according to yet another aspect of the invention. The illustration aims to explain that the dodecagon basic grid can be applied to a web from which four rows of twelve-sided blanks 5e are to be separated along discrete lines, after removing triangles of material 6e and trimming the edges as scrap 11a.

It is anticipated that the savings in coating of the coil and due to a recycling of uncoated scrap will offset the overall cost of the product arising from the conversion of the coil.

Obviously, the application of the perforating technique is feasible only for high outputs wherein a perforating unit can be inserted in the coil preparation line. This unit could replace the present edge trimmer.

Figure 10C:
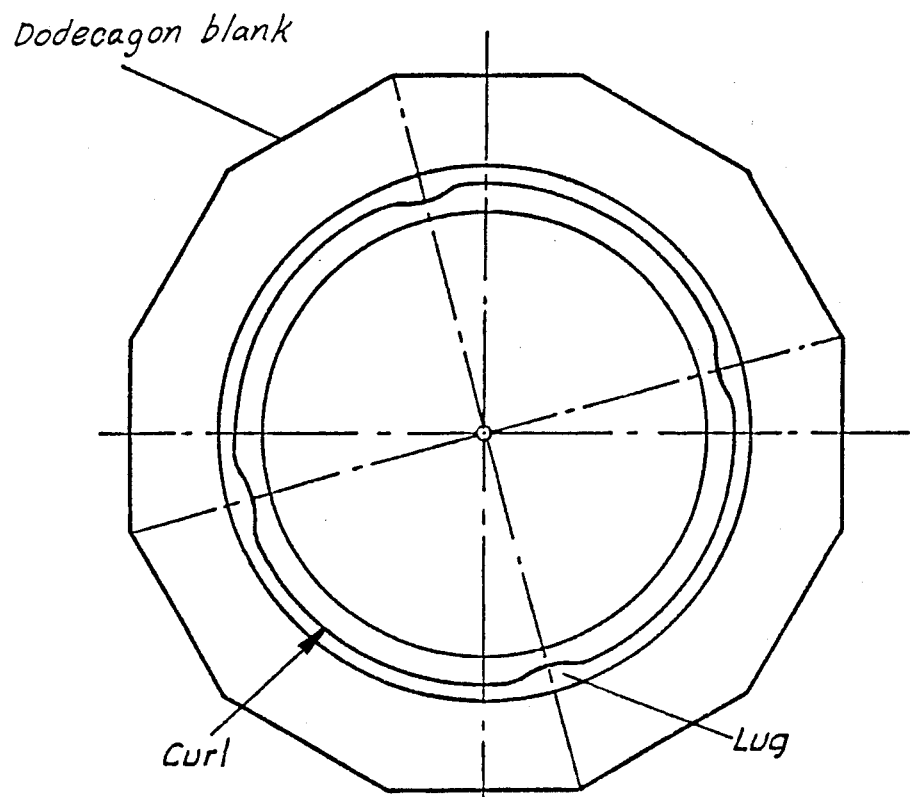
FIG. 10C shows a dodecagon blank adapted to be converted into a "twist-off cap"
Figure 10D:
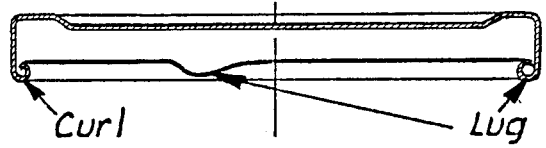
FIG. 10D shows the "twist-off cap" produced by means of the bland shown in FIG. 10C.

FIG. 10C shows a dodecagon blank made by a method illustrated in FIG. 10A, this blank being subsequently converted into a "twist-off cap", a section of which is shown in FIG. 10D. A significant benefit in this case is manifested by a possibility of using the additional material from the corners of the dodecagon blank to form the lugs. Cut-edge savings might be achieved by decreasing the curl size opposite the flats of the blank. Of course, the number of lugs can be increased depending on the size of the cap.

Figure 11A:
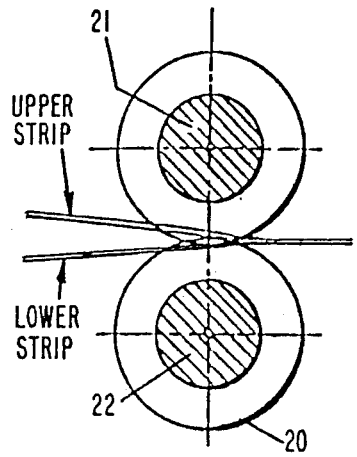
FIGS. 11A, 11B and 11C show the tool geometry for effecting straight-line slitting using two counterrotating cutter shafts in an end view, side view and top view, respectively.
Figure 11B:
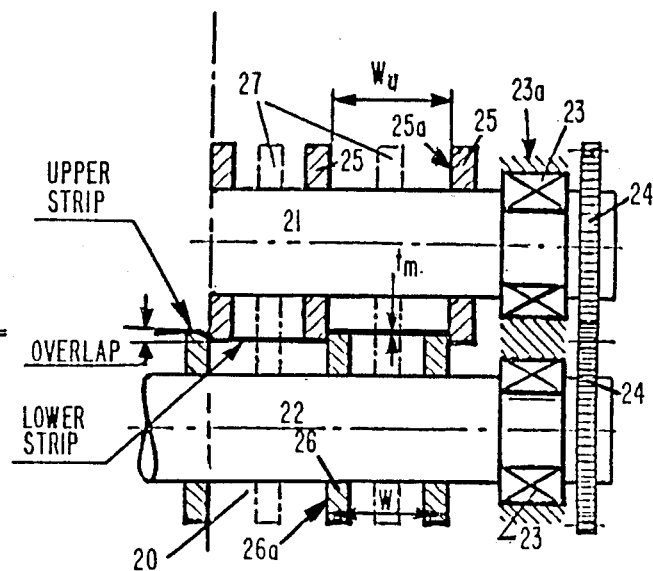
Figure 11C:
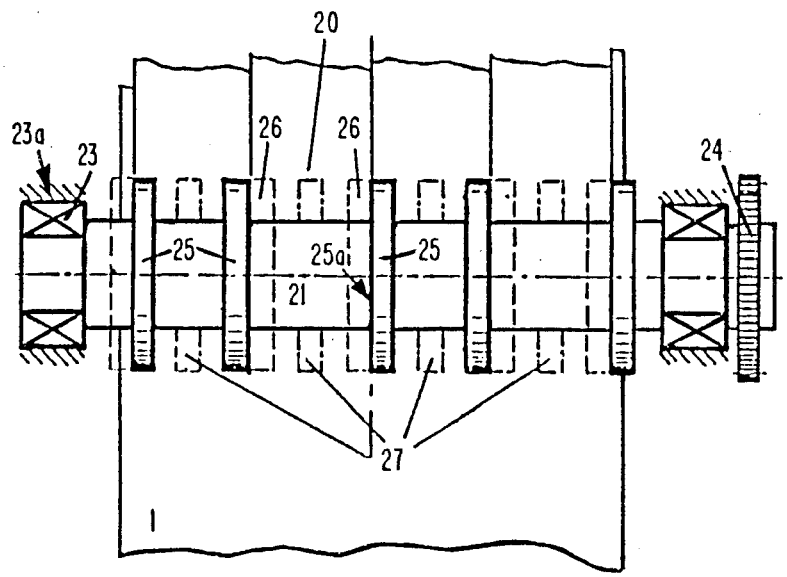

FIGS. 11A–11C show an arrangement 20 for slitting wide webs 1 into narrow webs. In FIGS. 11A–11C, the arrangement 20 is shown in different views. FIG. 11A illustrates a cross-sectional view in the direction of the rotational axes of two superposed cylindrical shafts, that is, an upper shaft 21 and a lower shaft 22. FIG. 11B is a side view and FIG. 11C is a top plan view of the shaft arrangement. At both ends, the superposed shafts 21 and 22 are supported by bearings 23 which rotationally mount these shafts in a machine frame 23A. As shown in FIGS. 11B and 11C, the shafts 21 and 22 are coupled together by two meshing gears 24, which counterrotate along with the shafts.

Each shaft 21, 22 carries cutter dies 25, 26 mounted on its cylindrical surface by various fasteners. The fasteners ensure that the cutting side faces 25a, 26a of the respective cutter dies 25, 26 are in precise perpendicular relationship to the rotational axes of the shafts. This is most important in order to maintain the slitting clearance necessary for burr-free edges on the narrow webs. The cutter dies 25, 26 are arranged in pairs as shown to avoid axial thrust on the bearings 23. The physical relationship between the shafts 21, 22 has to be ensured by preloaded bearings, as axial shaft movement cannot be tolerated since the ideal cutting/slitting clearance between the cutters is one-tenth of the material thickness "$t_m$", which could be as low as 0.015 mm. Hence, the cutting clearance would be 0.015 mm, meaning that the difference between the cutter cutting faces on opposite shafts is $W_u - W_1 = 0.03$ mm. The amount of cutter cylindrical surface overlap would be at least one material thickness "$t_m$". The effect of the amount of cutter overlap can be seen in the web/strip deflection after slitting up or down, depending on the actual position.

Positive advancement of the web 1 through the slitter arrangement 20, is ensured by so-called draw rolls 27 positioned between the cutter dies 25, 26. These draw rolls grip the coil by friction and push it through the slitting knives of the cutter dies.

The basic slitter arrangement 20, as seen, is simple and its "modus operandi" is limited primarily to a rotary motion to perform the slitting operation on the laterally guided web. One object of this aspect of the invention is to perform a more complicated slitting operation on the same simple arrangement consisting of the two counter-rotating shafts 21, 22 provided with suitable tooling 25, 26, 27 capable of producing a longitudinal scroll shape slitting effect. Hence, the geometry of scroll slitting tools and the ability to make these tools are two important aspects of this invention.

FIG. 12 illustrates the technique for cutting the web perpendicularly and across 90° to its direction of movement (see the layout of FIG. 10A) using a rotary slitter mechanism provided with flying (or rotary) dies. It can be seen that flying cutter action across the traveling web may be combined with the rotary slitting action along the traveling web to result in a scroll-slitting action at any angle. In FIG. 12, the upper cutting edge 25a is rotating around the center "$O_U$" and the lower edge 26a turns about the center "$O_L$" at the same angular velocities. This means that the pitch cylinders of both shafts are contacting and rolling without any slip, since the respective pitch circle radii "$R_U$" and "$R_L$" are equal. To achieve the correct cutting relationship of the cutting edges, the lower tool 26 in FIG. 12, which is leading, has to have an addendum "ad" above the pitch circle, which may be equal to about two material thicknesses "$t_m$", whereas the trailing edge has a dedendum "dd", which results in a lower linear velocity of the upper cutting edge relative to the lower cutting edge. The dedendum may be equal to material thickness "$t_m$", thus the maximum engagement of both cutting edges "n" would be equal to the material thickness "$t_m$".

As seen in FIG. 12, the cutting clearance between the upper and lower cutting edges 25a and 26a, respectively, is negative before the contact with the material as shown at points "G" and "H". At point "J" when both cutting edges, after penetrating through the material thickness "$t_m$", have met, the cutting clearance might be zero, but in practice it will be minimal, about one-tenth of the material thickness "$t_m$". From point "J" onwards, the clearance between the cutting edges is increasing steadily as shown at points "P" and "S". This means that no interference may take place between the cutting edges, particularly when they move out of engagement.

There is a relationship between the pitch circle radii "$R_U$" and $R_L$", tool engagement "n", angle of tool engagement "$2\alpha$" and the tool clearance, when moving out of engagement. An approximate value of the angle can be calculated from the cosine formula:

$$\cos. \alpha = \frac{R}{R + n/2} = \frac{R}{R + \frac{ad - dd}{2}}$$

Given the angle $\alpha$, the tool clearance "cl" equals:

$$cl = 6 \text{ n sin. } \alpha = 2 \text{ (ad+dd) sin. } \alpha$$

The tool engagement "n" has to be checked also from the deflection aspects of both cutter shafts. Both addendum "ad" and dedendum "dd" may have to be increased, so under the load conditions the tool engagement "n" is at least between one-half and one material thickness.

Figure 13A:
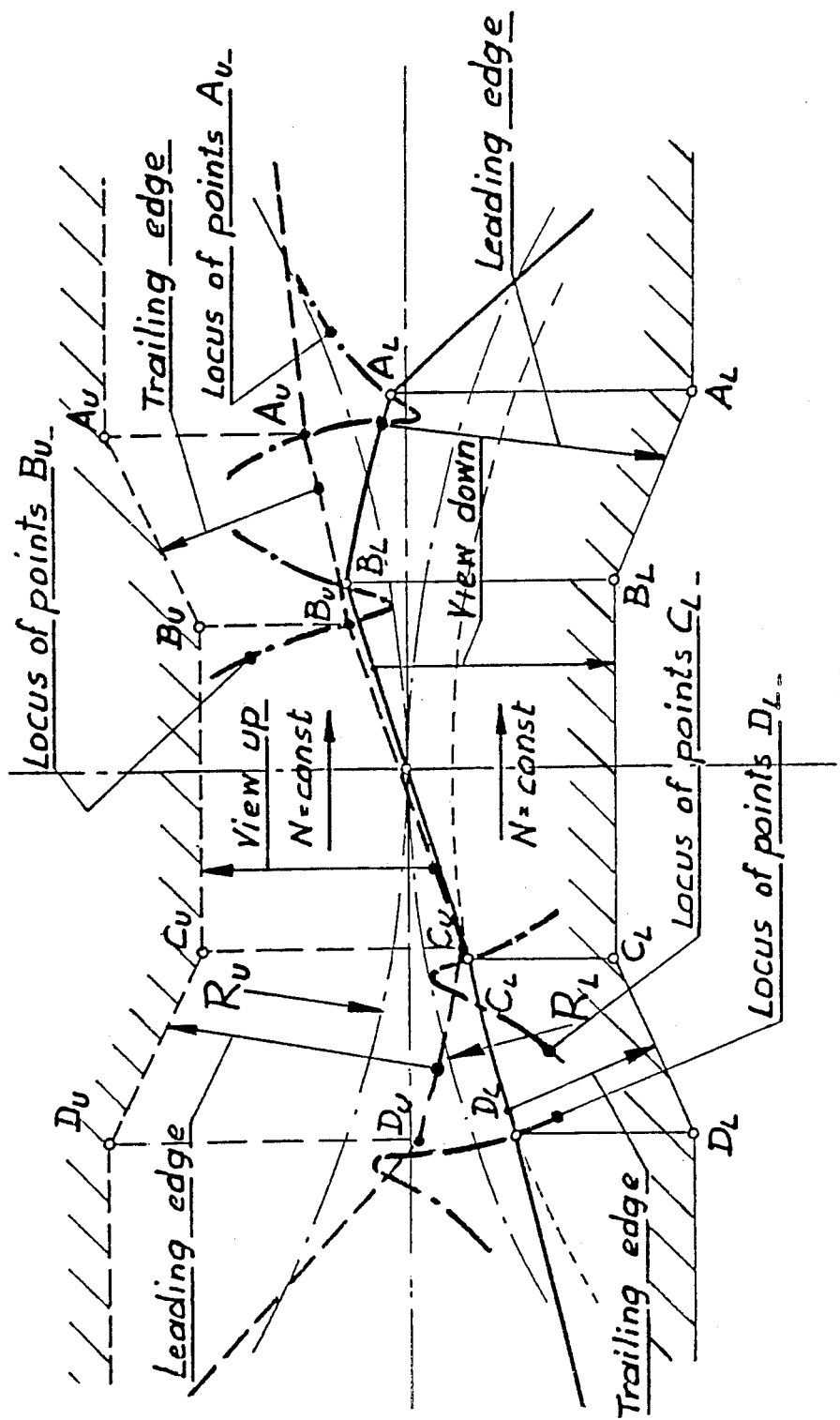
FIGS. 13A, 13B and 13C are diagrams of scroll slitting cutters constructed in accordance with the invention.
Figure 13B:
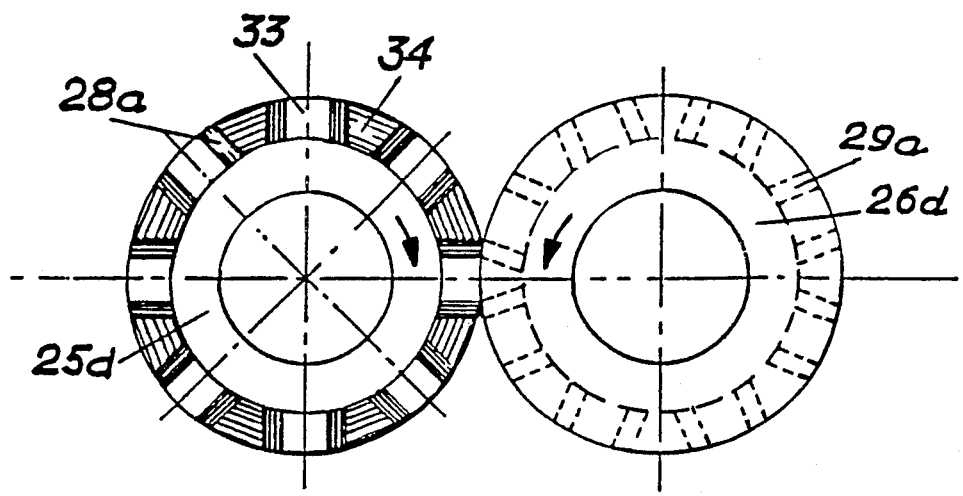
Figure 13C:
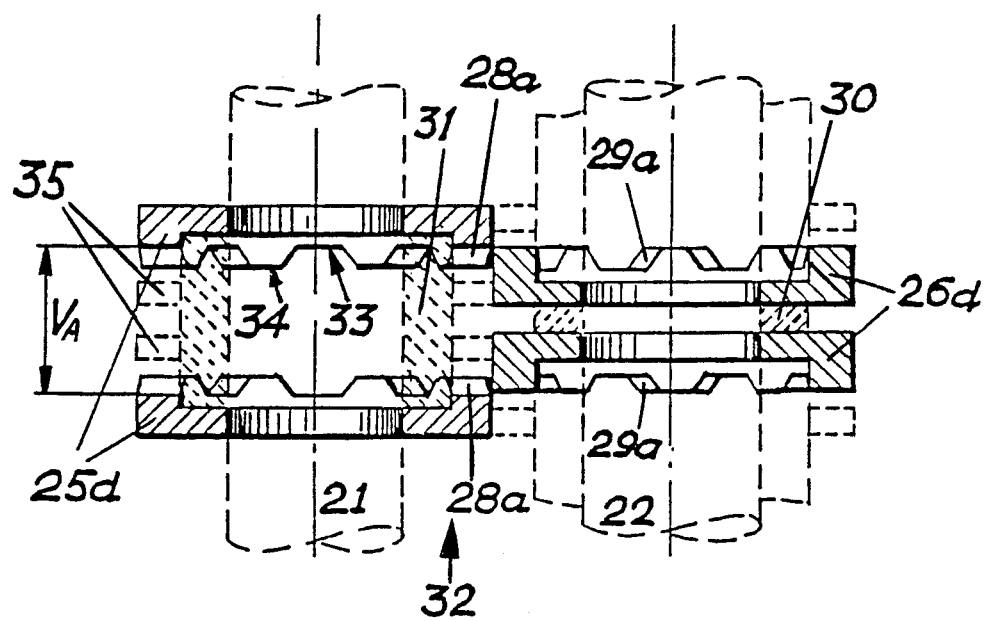

FIGS. 13A–13C illustrate a rotary cutting and shearing technique for the purpose of longitudinal scrolling as shown diagrammatically in FIG. 5A, whereby a wide web 1 is divided into four narrow webs with scrolled edges 4a. It shows how it is possible to combine the well-known longitudinal slitter, normally used for straight-linear slitting as in FIG. 1, with cutting across the coil, by modifying the slitting cutters to the shape as in the arrangement 32 shown in FIGS. 13A–13C.

FIG. 13A shows the application of rotary cross-cutting to longitudinal scroll slitting, whereby the slitting line assumes inclined paths in relation to the slitting direction at about 30°. This means that along these lines there is a condition in which cross-cutting is combined with slitting. In case of cross-cutting, identical rules must prevail as shown in FIG. 12, in which the leading cutting edge must be above the pitch circle defined by radius "RL", while the trailing cutting edge must be inside the pitch circle defined by radius "RU".

In FIG. 13A, it is shown clearly how the leading inclined cutting edge AL–BL interacts with the trailing edge AU–BU. The points AU–BU generate contracted epicycloids in relation to points AL and BL. These epicycloids are therefore the respective "Loci" of points AU and BU. Between points BL and CL interaction takes place with line BU and CU, resulting in standard slitting action. However, these lines have to cross the pitch circles in order to create the correct conditions for combined cross-cutting and slitting along C–D lines, whereby the top edge CU–DU assumes the leading position and the bottom edge CL–DL is trailing. In this case the bottom points CL and DL generate contracted epicycloids in relation to CU and DU.

In FIG. 13C, only two pairs of cutters 25d, 26d are shown. These cutters are identical and are provided with suitably shaped side faces 28a, 29a which correspond to the required scroll shape. On the right in FIG. 13C, the cutters 26d are positioned back-to-back with a spacer 30 in between. On the left, the cutters 25d are oriented on the shaft 21 front-to-front with a spacer 31 in between. The distance or thickness of the spacer 31 is such that the scrolled web width "$V_a$" (FIG. 5A) is obtained. The cutters are, of course, rigidly attached to the shafts by well-known means (not shown) to ensure not only their axial positions on the shafts, but also their angular positions, both being vitally important for correct functioning of the arrangement 32.

In FIG. 13B, the front faces 28a, 29a of the cutters 25d and 26d respectively, are illustrated. In this case, there are eight basic scroll shapes. For simplicity in the manufacture of the dies, the valleys 33 are of constant width and depth, and can be made by means of parallel profile grinding. In between the valleys 33, tapered shapes or tops 34 are formed. These tops 34 can be surface ground to ensure correct height in relation to the depth of the valleys 33.

Obviously, the cutter shafts 21, 22 have to be intergeared (i.e., gears 24 in FIG. 11B) without any backlash to maintain a correct tangential relationship. The shafts 21, 22 are provided with suitable thrust bearings (i.e., bearings 23 in FIGS. 11B and 11C), whereby correct pre-loading will ensure the necessary axial relationship to maintain the desired axial cutting clearances.

To ensure the positive advancement of the web 1 through the scroll slitter, draw rolls 35 (FIG. 13C) might be provided, which then grip the web by friction against the cutter cylinders 25d and 26d, respectively, thus ensuring correct profiles of the scrolled webs.

Figure 13D:
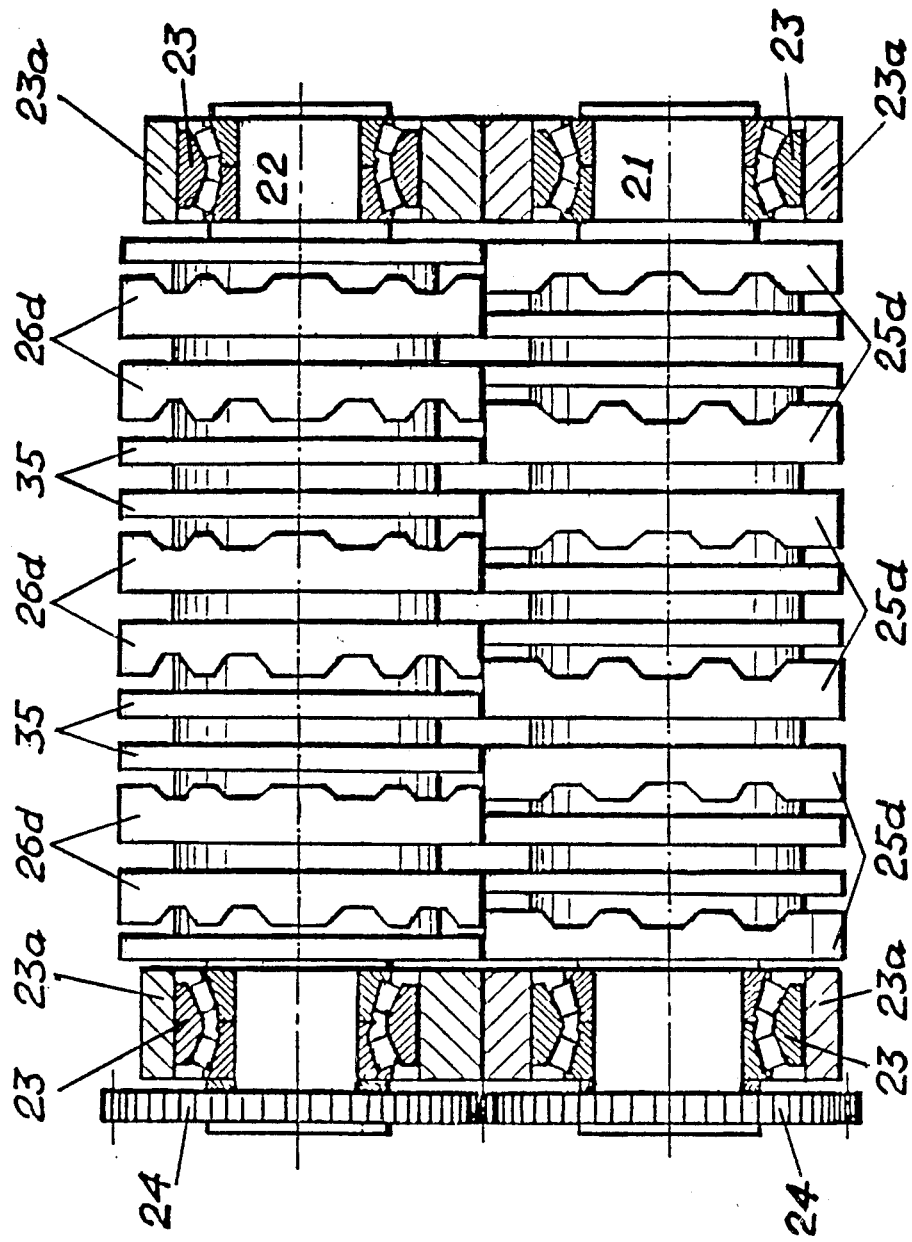
FIG. 13D shows the assembly for the scroll slitter incorporating the basic slitting tool components illustrated in FIGS. 13A, 13B and 13C.

FIG. 13D shows the assembly of the scroll slitter incorporating the basic slitting tool components illustrated in detail in FIG. 13C. In order to slit a wide web into five narrow scrolled webs, shaft 21 carries three sets of cutters 25d, and shaft 22 correspondingly bears three sets of cutters 26d. Draw rolls 35 are provided between individual cutter sets 25d and 26d to grip the web against opposite cutter surfaces. Both shafts 21 and 22 are rotatably mounted in pre-loaded bearings 23 located in bearing blocks 23a. Gears 24, which are of the backlash-free type, ensure a synchronized relationship between both shafts 21 and 22.

Figure 14A:
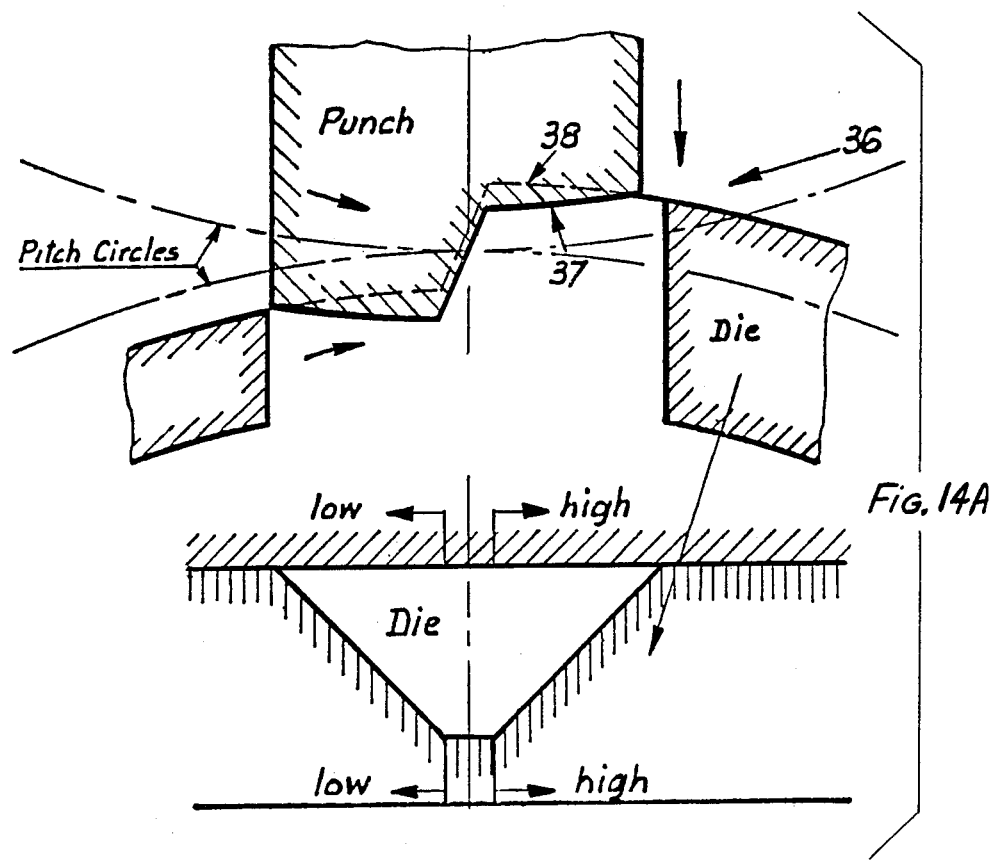
FIGS. 14A and 14B are diagrams showing triangular hole punching tools and alternative round hole punching tools, respectively.
Figure 14B:
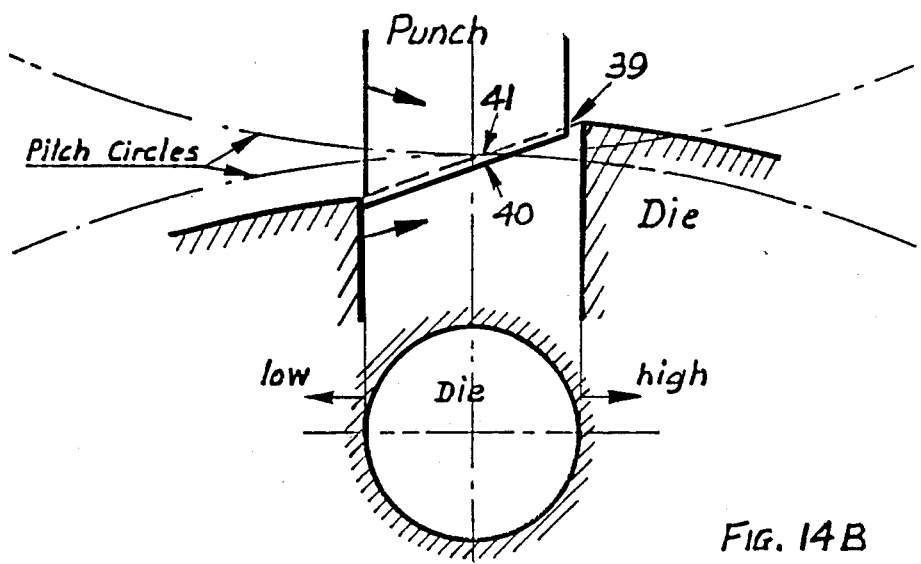

FIGS. 14A and 14B are a side view and a plan view, respectively, showing how the technique illustrated in FIG. 12 can be used for the purpose of punching holes in a web, using two counterrotating intergeared slitter shafts. In FIG. 14A, a tool 36 for punching a triangular hole is shown schematically. Here again the principle of the trailing edge moving slower than the leading edge has been maintained and the levels of both the punch and the die faces 37 and 38, respectively, have to change accordingly depending on the geometry of the hole. In the case of a triangular hole, one has to compromise in one sharp corner, so the tool face level can be changed from leading to trailing and vice versa. Punching a circular hole as seen in both views in FIG. 14B requires a much simpler tool 39. Both tool faces 40 and 41 of this tool 39 are inclined to correspond to a leading and trailing configuration.

Figure 15:
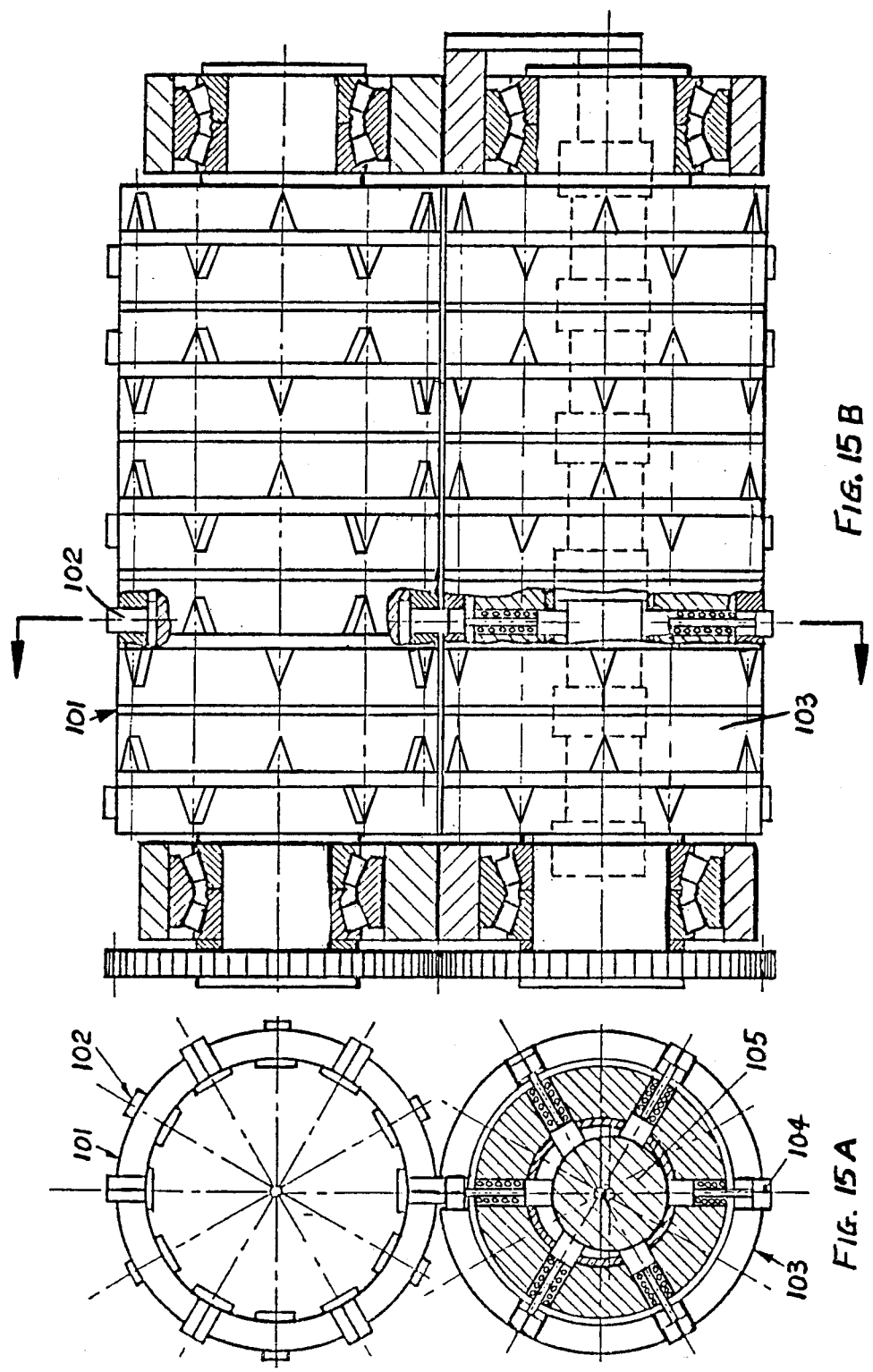
FIG. 15A is an end view of a pair of mating punching tools in a punching assembly.
FIG. 15B is a side view of the tools illustrated in FIG. 15A.
FIG. 15C shows a slitting assembly adapted to separate the pre-punched wide web, as illustrated in FIG. 10A, into narrow single blank row webs.
Figure 18:
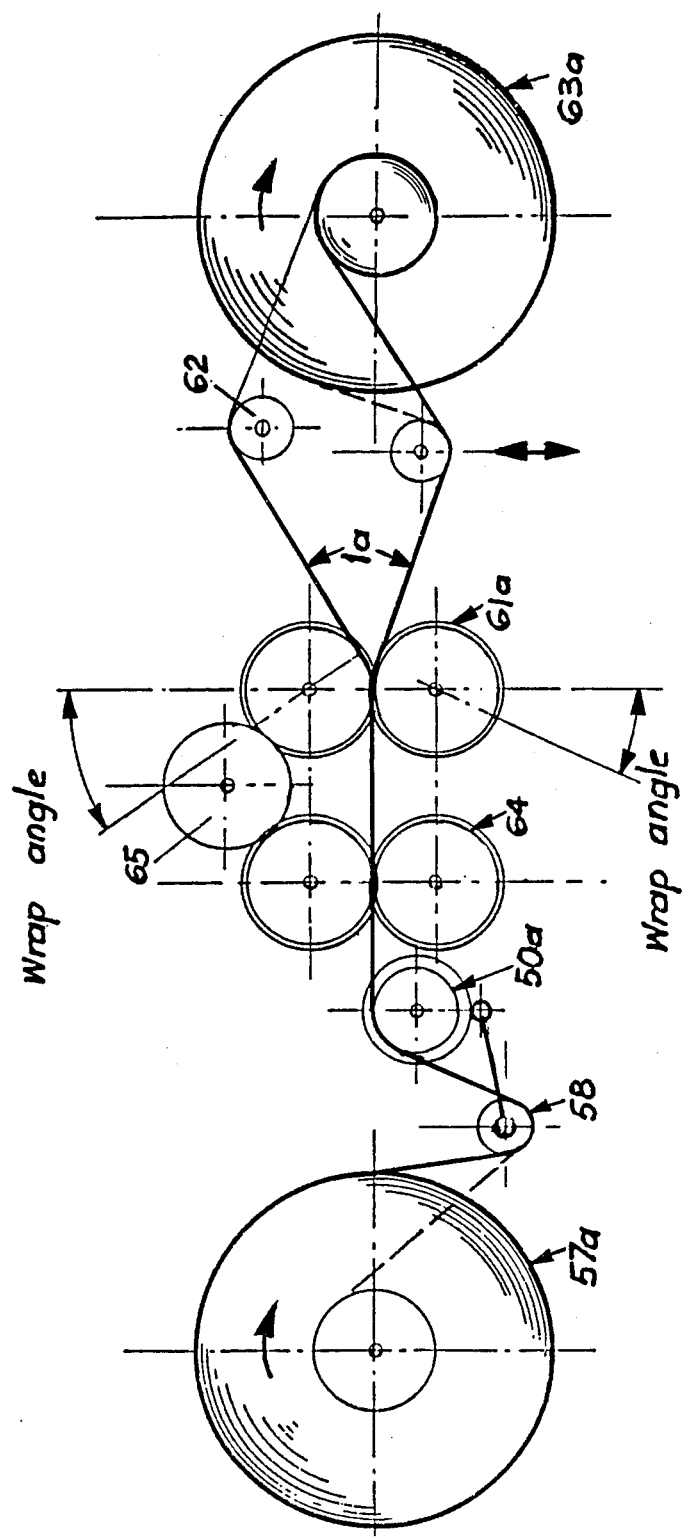
FIG. 18 illustrates a slitting line arrangement constructed in accordance with the aspects of the invention illustrated in FIGS. 6A and 8A.

FIG. 15B shows the schematic principle of the punching assembly which cooperates with the slitting assembly illustrated in FIG. 18. Basically there are two counterrotating intergeared shafts as in any slitting machine. The top shaft 101 is provided with punches 102 of triangular shape and the lower shaft 103 is tooled-up with dies, which cooperate with the punches. The tool geometry is shown in FIG. 15A. To obtain the necessary precise notching of tool components in both slitter shafts, there are two types of rings fitted on the cutter shafts. One form of rings consists of just plain rings provided with cutting edges on both sides. Another form of rings includes "V" notches, which in the top tool provide the precise guidance for the punches, and in the bottom tool they serve as cutting dies, the edges of which cooperate with the edges of the punches.

By the punching tool action, the triangular fragments of plate are pushed into the die. These fragments have to be pushed out by a positive knock-out 104 operated by an eccentric shaft 105 mounted inside the lower slitter shaft 103. This eccentric shaft is constrained and prevented from rotating.

Figure 15C:
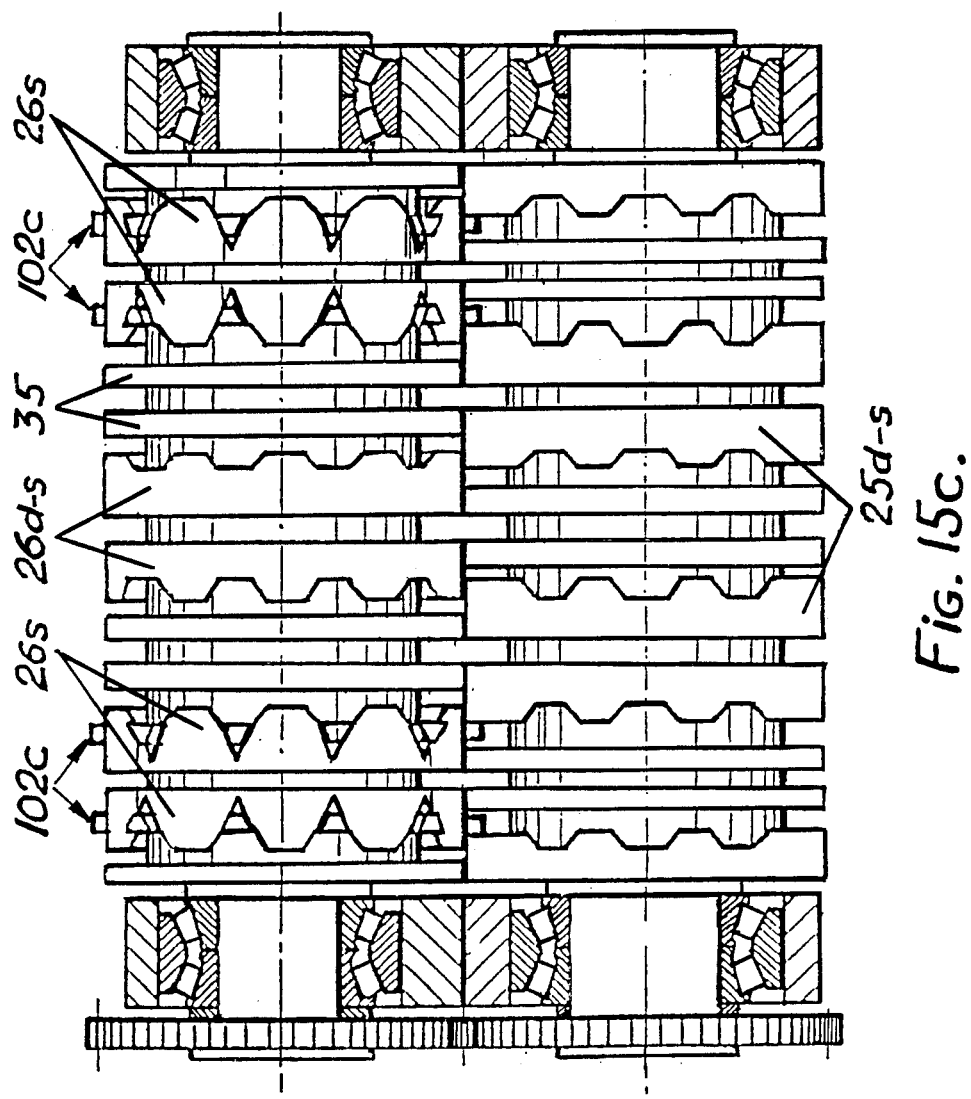

FIG. 15C shows the slitting assembly which separates the pre-punched wide web, as illustrated in FIG. 10A, into narrow single blank row webs representing a row of dodecagon blanks by cutting the web along lines S (see FIG. 10A) inclined to the direction of web feed at 30°. In order to slit precisely along the lines S in relation to the punched triangular holes, locating pegs 102c are fitted in the external pairs of slitter cutters 26s. The locating pegs 102c engage the triangular holes in the web by wrapping the web around the peg-carrying slitter shaft prior to slitting. The internal slitter cutter assemblies 26d–s and 25d–s are merely slitting the web, whereas the exact synchronicity with the punched holes is achieved by the pegs fitted in the outer scroll cutter assemblies.

Figure 16A:
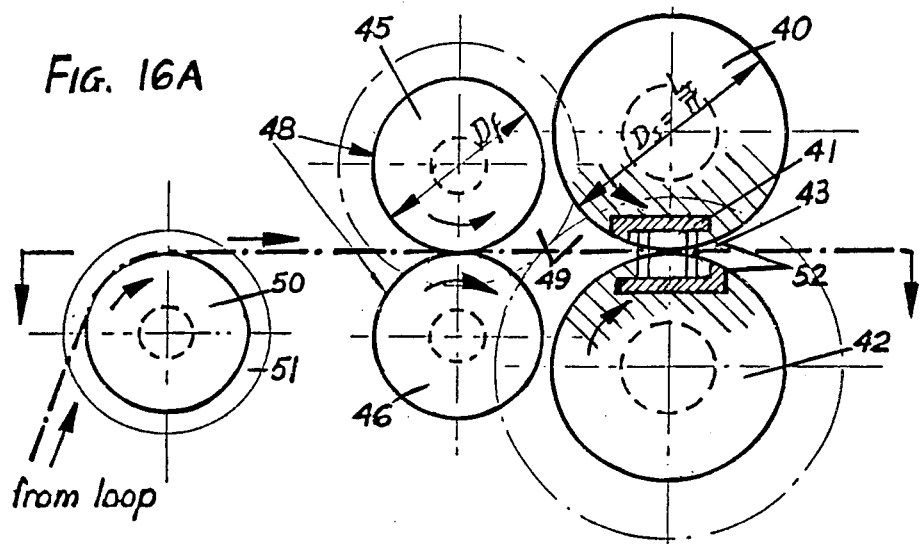
FIGS. 16A and 16B show the application of the rotary slitter to a flying shear for effecting primary scrolling.
Figure 16B:
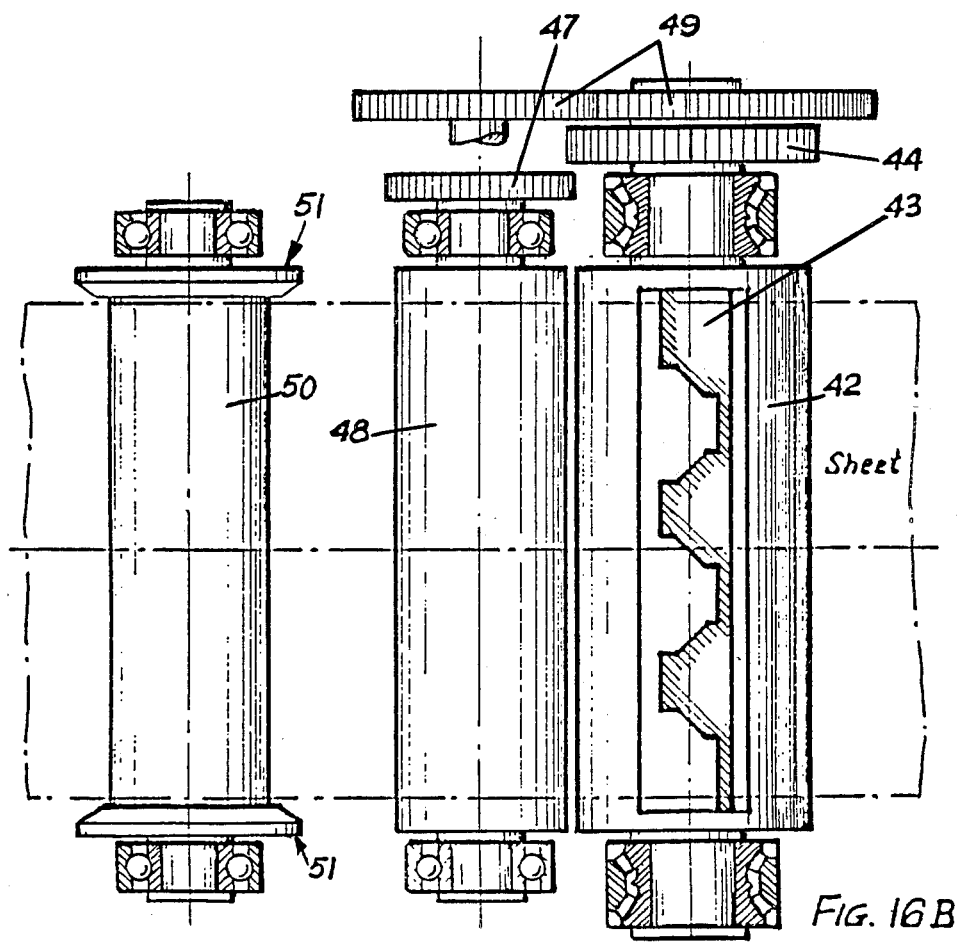

FIGS. 16A and 16B illustrate a technique for cutting up the web 1 into so-called primary scrolled sheets along nonstraight transverse scroll lines 3 as illustrated in FIG. 3A. In this case, rotary slitting is combined with cropping across the web by means of flying or rotary dies. Indeed the invention in this embodiment is of an extreme character. Nevertheless, the basic mechanism is similar to the typical slitting arrangement with two counterrotating intergeared shafts. A top punch shaft 40 carries a punch 41, which is trailing, hence its diameter is $Ds = L7/\pi$ less dedendum; while a bottom die shaft 42 carries a leading die 43 which has its diameter increased by an "addendum". Both shafts 40 and 42 are intergeared by a pair of backlash-free gears 44 (FIG. 16B). Since the circumference of both punch and die shafts 40 and 42 is equal to the sheet length L (FIG. 3A), cutting of the web takes place at a constant web and mechanism velocity. To ensure the required sheet length accuracy, the coil 1 passes between two feed rolls, namely, a top feed roll 45 and a bottom feed roll 46, which precede the punch and die shafts 41, 42. Both feed rolls 45, 46 have identical diameters "Df" and are intergeared by gears 47 (FIG. 16B), so their surfaces 48, while contacting the web 1, are moving at the same velocity. FIG. 16A illustrates that the top feed roll 45 is driven by the die shaft 42 through a feed drive gear 49, the ratio of which is Ds:Df. Since "Df" is smaller than "Ds", the feed rolls 45, 46 are rotating faster than punch and die shafts 40, 42, but the tangential velocities are identical. To direct the web in a precise lateral relationship to the die 43, the web 1 passes from a loop (not shown) over a web deflector roll 50, which is provided with guide flanges 51, which contact the edges of the web over a certain wrap angle. Normally there will be additional edge guides (not shown) on both sides of the feed rolls 45, 46. To ensure a positive grip on the web passing between the feed rolls 45, 46, the bottom feed roll 46 can move up and down by pneumatic means (not shown), which is standard practice in similar applications.

The deep scroll punch and die 41 and 43 are made precisely in a similar way as those normally used in a reciprocating application, i.e., the profiled faces are perpendicular to the base surface. However, the top surface 52 is ground to a cylindrical shape. Slight corrections to the profile of the die and punch must be introduced to compensate for punch dedendum and die addendum.

Figure 16C:
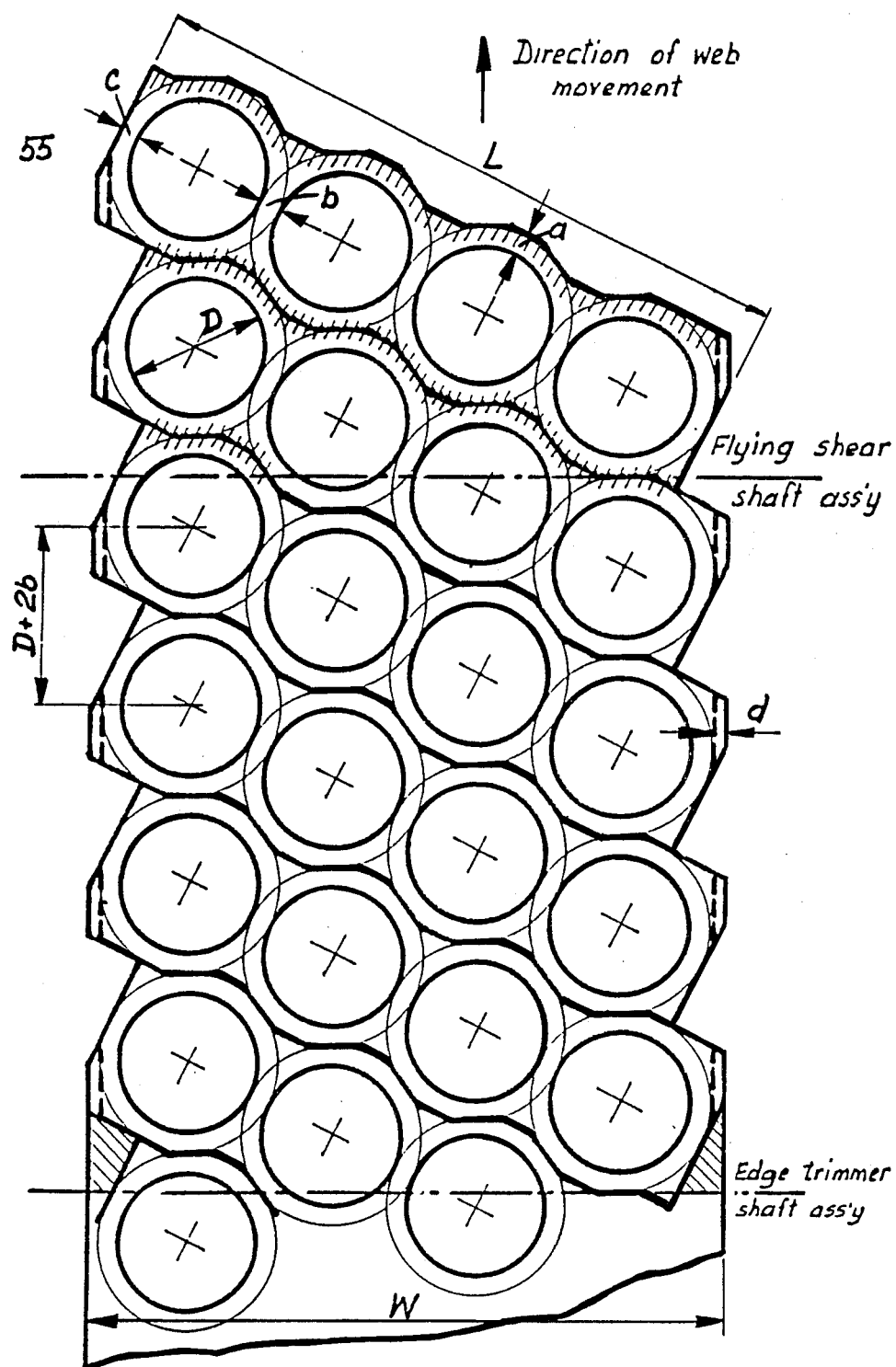
FIG. 16C shows the principal layout of a combination of rotary edge trimming and rotary shearing according to a further aspect of the invention.

FIG. 16c shows schematically how the present invention, according to an additional aspect, could be adapted, using the combination of a rotary edge trimmer shaft assembly and a rotary flying shear shaft assembly, for use in conjunction with a rotary slitter principle. The end product, which is a single row multi-blank strip 55, is well known in present conversion practice, whereby a crank-operated reciprocating press cuts up the web along a scroll line. The apparatus, basically aimed at longitudinal scrolling, may be modified to perform the web cutting-up operation at an angle which, in the illustrated case, is close to 30°. In this case, there could be a cosine of 30° relationship between the web width "W" and strip length "L". The material usage efficiency U would be similar to that achieved by the technique illustrated in FIG. 4. However, similar and easier strips are obtainable by a combination shown in FIGS. 10A and 10B.

Figure 17:
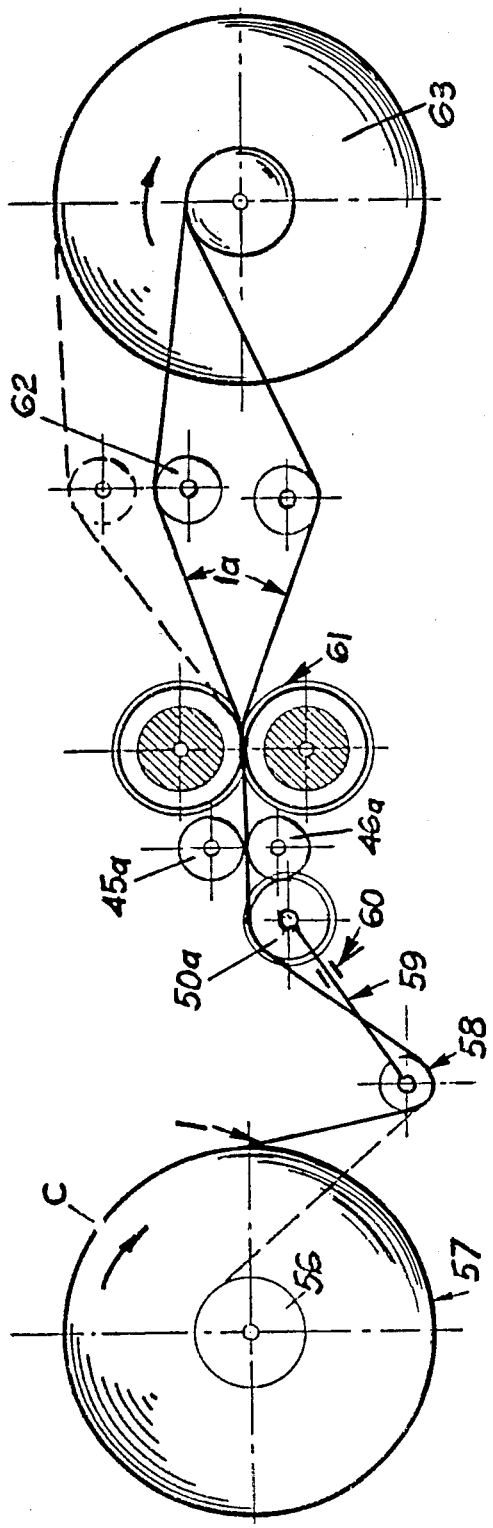
FIG. 17 illustrates a slitting line arrangement constructed in accordance with the aspect of the invention shown FIG. 5A.

FIG. 17 shows schematically one embodiment of a scroll slitting line constructed in accordance with the present invention to produce narrow longitudinally scrolled webs from a wide web, as shown in FIGS. 5A and 5B. More particularly, a coil C of wide material is placed on an expanding mandrel 56 of an uncoiler 57 and is positively clamped from inside, so that it can be rotated in a controlled manner. The web 1 of the material taken from the coil C passes over a rotatably mounted dancer roll 58 mounted on a pivot arm 59. The arm 59 of the dancer roll 58 operates a switch 60, which controls the revolutions of the uncoiler 57 to maintain a constant tension on the web. The web 1 of the material then passes over a deflection roll 50a, controlling its lateral position and bringing it onto the feeding and processing plane. A pair of feed rolls 45a, 46a intergeared with a slitting assembly 61 (see FIGS. 16A and 16B) meters the web at a precise rate into the slitting cutter of this assembly, which divides the wide web 1 into a narrow web along scroll lines 4b and 4c similar to those illustrated in FIGS. 5A and 5B, respectively. By the nature of the arrangement of the slitting assembly 61, some narrow webs 1a will be deflected upwardly and some downwardly depending on the combination of the associated slitting cutters. The narrow webs 1apass afterwards over individual adjustable deflector rolls 62 before being recoiled on a recoiler 63.

Although only one recoiler is shown in FIG. 17, in practice there will be at least two. This is necessary due to a scrolled edge character. Most probably, individual coils will have side plates to facilitate recoiling in the first place, and then to protect the scroll edges from handling damage. FIG. 17 does not show the disposal means for the edge trim.

In this arrangement of the simple slitting assembly 61, it is important to maintain a "no slip" condition between the feed rolls, so the scrolled profiles are accurate, which is absolutely essential for subsequent processing of the scrolled webs.

FIG. 18 illustrates schematically another embodiment of a scroll slitting line constructed in accordance with the present invention. In this embodiment, an additional operation is contemplated prior to the longitudinal slitting. This operation involves the punching of triangular holes in the web in a precise pattern, which is compatible with the scroll slitting geometry.

As in the previous embodiment shown in FIG. 17, there are uncoiling and recoiling provisions 57a and 63a which could be similar and their functions would be identical.

The major difference manifests itself in the work station consisting of a punching assembly 64 and a slitting assembly 61a, both being intergeared by a blacklash-free gear arrangement 65. To achieve synchronization betweeen the punching assembly and the slitting assembly, there has to be a micro-adjustment (not shown) between the driving gear of the punch assembly 64 and the hub of the driven shaft. This is absolutely essential, as the punched holes 6, 6a in the web 1 must synchronize with the locating pegs on the shafts of the slitting assembly 61a. The locating pegs (not shown) ensure that the angular slitting takes place in exact and precise relationship to the triangular holes, thus avoiding and preventing formation of slivers which would be detrimental on a number of accounts, but above all the consequential inaccuracies would make the scrolled web useless for further processing. After slitting, the narrow webs 1 remain in contact with the respective shafts over a certain wrap angle (shown are different sized wrap angles at the respective slitting shafts), ensuring that at any time two pairs of locating pegs are engaging in V notches provided in the slit webs. These V notches are previously created in the punching assembly.

The arrangement as described above is capable of producing longitudinally scrolled webs which may be cut up eventually to equilateral dodecagon blanks. It is also possible to arrange the tools in such a way that compensation for anisotropy (FIGS. 6B, 8A) might be introduced, which results in modified dodecagons after the cutting up of webs into individual blanks. Basically the principle of generating the "grid" for blanks is similar, but the triangular holes 6a are smaller if compensation for anisotropy is contemplated.

Figure 19:
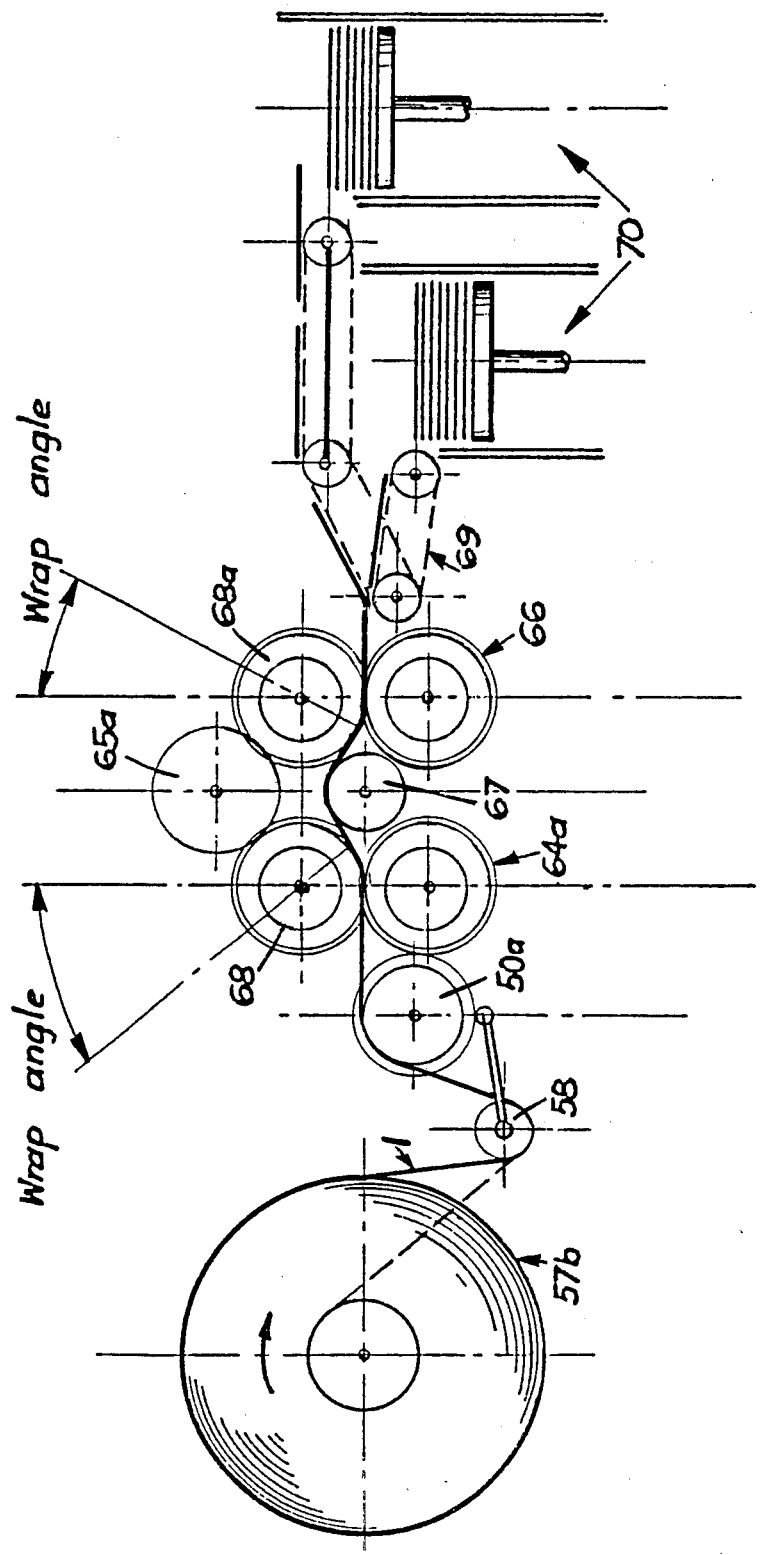
FIG. 19 illustrates a slitting and cutting up line arrangement constructed in accordance with the aspect of the invention illustrated in FIG. 10A.

FIG. 19 illustrates schematically a further embodiment of a scroll slitting line constructed in accordance with the present invention in which the web 1 is subjected at first to a triangular punching operation, which is subsequently followed by slitting along angled slit lines combined with cropping across the slit web (FIG. 10A). In this embodiment, the triangular punched holes (6d in FIG. 10A) must be compatible with the scroll slitting and lateral cropping tool geometry.

As in the previous two embodiments, the uncoiling provisions 57b are identical. Also, the punching assembly 64a is similar to that in FIG. 18 and is driven from a slitting and cropping assembly 66 through an intergear 65a. In between the work assemblies, a deflector roll 67, which is freely rotating, lifts the coil upwards, primarily to create a wrap angle around the top shafts of both assemblies to ensure precise synchronization. It follows that when punching dies of the punching assembly 64a are in progressive engagement, at least two pairs of punches locate the web on the top punching shaft 68 due to the wrap angle indicated, thus ensuring the highest degree of precision in the longitudinal positions of the triangular holes (6d in FIG. 10A).

The slitting and cropping assembly 66 must be capable of producing individual dodecagon blanks (5d in FIG. 10A), hence cropping dies are fixed in suitable localities in between locating pegs (not shown) engaging in V notches provided in the punched web. The wrap angle around the top shaft 68a of the slitting and cropping assembly 66 ensures not only correct synchronization for longitudinal slitting, but also for the lateral cropping of the narrow webs. Here again at least two pairs of the locating pegs (not shown) have to engage the web prior to slitting at the instant when cropping takes place (see FIG. 10A left position). This constraint defines the magnitude of the wrap angle.

After slitting and cropping, multi-blank strips (5c in FIG. 10A) or individual dodecagon blanks (5d in FIG. 10A) are deposited on suitable conveyors 69 for final delivery into stacker boxes 70. Obviously, two stacker boxes preceded by two conveyor assemblies are necessary for efficient stacking.

Figure 20:
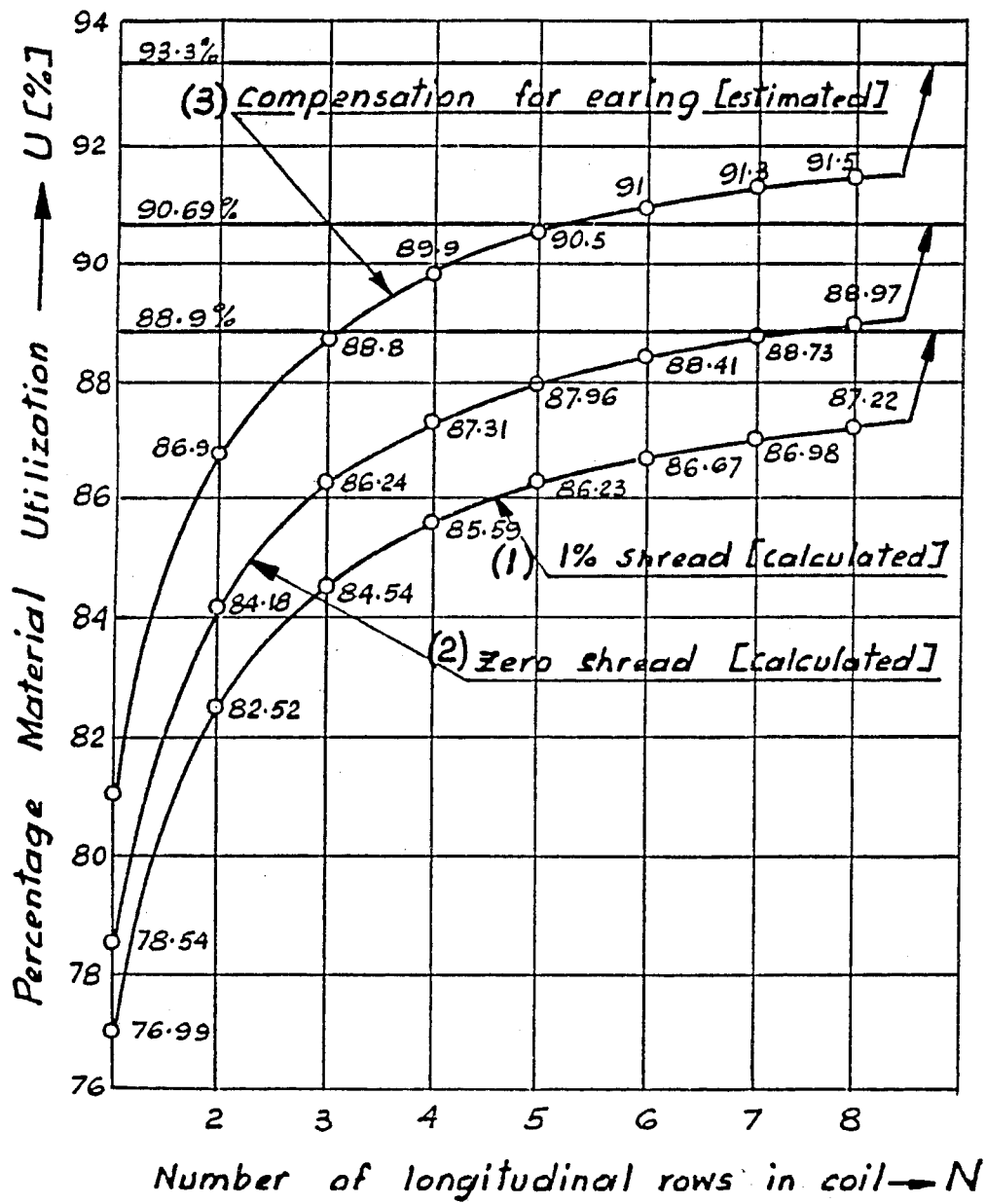
FIG. 20 is a graph showing the comparison of material utilization factors for round blanks and twelve-sided blanks.

FIG. 20 is a graphical representation of the material utilization factor U as a function of the number of rows N in the web for (1) round blanks with a one percent of diameter shred, (2) twelve-sided blanks without any shred and (3) twelve-sided blanks with compensation for earing.

The trend is evident. Narrow webs having less than three rows of blanks are simply uneconomical.

The difference between no shred and a 1% shred is 1.75% in material utilization, which is substantial. This means that twelve-sided blanks can be justified economically and can be used to also compensate for the effect of earing by offering up to 2.5% more material for conversion compared with the equilateral twelve-sided blanks. Compared with presently established practice, area utilization is improved by about 4.25% which is substantial.

Obviously, the saving of material depends on the degree of earing, which is influenced by the material properties arising from composition, rolling degree, and the heat treatment.

The position of points on the graphs showing the material utilization factor can be determined by mathematical formula as follows:

$$U = \frac{\pi}{4\left(1 + \frac{a}{D}\right)^2 \left[\frac{1}{N} + \left(1 - \frac{1}{N}\right)\frac{3}{2}\right]}$$

where
a = shred allowance
D = blank diameter
N = number of rows

The formula is valid for positive and zero values of shred allowance "a".

The same formula appears to be valid if additional material is taken from the shred and added to the blank, as takes place when compensating for "earing". In such a case, "a" has a negative value.

It has been shown by calculation that for a 2.5% gain in the material utilization factor, the allowance "a" should be "−0.0141D".

The formula for the graph showing compensation for earing is as follows:

$$U = \frac{\pi}{4(1 - .0141)^2 \left[\frac{1}{N} + \left(1 - \frac{1}{N}\right)\frac{\sqrt{3}}{2}\right]}$$

hence when $N = 1$ $U = 80.8\%$
and when $N \to \infty$ $U = 93.3\%$ (assymptopic value)

The intermediate values up to N=8 have been entered in the graph. However, since the material utilization factor is not influenced by geometry alone, but also by material anisotropy, the values for the material utilization factor must be deemed as "estimated".

Nevertheless, the modified dodecagon blanks improve material utilization, in addition to achieving the "zero" shred advantage derived by employing an equilateral dodecagon.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. Apparatus for dividing a web of metallic material into a plurality of strips from which polygonally-shaped blanks are to be made, comprising perforating means for perforating said web at predetermined locations, said perforating means including a first set of cutting tools mounted for rotation in one arcuate direction and a second set of cutting tools mounted for rotation in an opposite arcuate direction such that each cutting tool of said first set cooperates with a corresponding one of said cutting tools of said second set to perforate said web as said web is fed between said first and second sets of cutting tools; longitudinal scroll slitting means for slitting said web along at least one scroll line which extends generally longitudinally along said web, said longitudinal scroll slitting means including a third set of cutting tools mounted for rotation in one arcuate direction and a fourth set of cutting tools mounted for rotation in an opposite arcuate direction such that each cutting tool of said third set cooperates with a corresponding one of said cutting tools of said fourth set to slit said web along said at least one scroll line as said web is fed between said third and fourth sets of cutting tools; and deflecting means positioned between said perforating means and said longitudinal scroll slitting means for deflecting said web such that said web is partially wrapped about said cutting tools of one of said first and second sets of cutting tools and said cutting tools of one of said third and fourth sets of cutting tools.

2. The apparatus of claim 1, further comprising lateral cross slitting means for slitting said web along a plurality of separating lines, each of said separating lines extending generally transversely of said web.

3. The apparatus of claim 2, wherein said lateral cross slitting means cuts said web into a plurality of individual strips.

4. The apparatus of claim 3, further comprising transporting means for transporting said individual strips to stacking means for stacking said individual strips one on top of the other.

5. The apparatus of claim 3, wherein a plurality of blanks can be made from each of said strips, whereby each of said strips can be cut into a plurality of blanks.

6. The apparatus of claim 3, whereby only a single blank can be made from each of said strips, whereby each of said strips is a blank.

7. The apparatus of claim 2, wherein said lateral cross slitting means includes at least a pair of cooperating cutting tools having cutting edges which travel at the same angular velocity, said cutting edges having a substantially zero clearance between them at a point before they reach their maximum engagement.

8. The apparatus of claim 1, wherein said first set of cutting tools is mounted on a first rotatable shaft and said second set of cutting tools is mounted on a second rotatable shaft, said first and second shafts being mounted generally parallel to each other and being driven in synchronization with each other through anti-backlash gearing.

9. The apparatus of claim 8, wherein said first set of cutting tools includes punches and said second set of cutting tools includes dies which cooperate with said punches to punch out polygonally-shaped pieces of material from said web as said first and second sets of cutting tools are rotated conjointly with said first and second shafts, respectively.

10. The apparatus of claim 9, wherein said punches and said dies have a triangular cross-sectional shape and have inclined faces, one of which trails the other.

11. The apparatus claim 9, wherein said perforating means perforates said web before said web is slit along said at least one scroll line by said longitudinal scroll slitting means.

12. The apparatus of claim 11, wherein said third set of cutting tools is mounted on a third rotatable shaft and said fourth set of cutting tools is mounted on a fourth rotatable shaft, said third and fourth shafts being mounted generally parallel to each other and being driven in synchronization with each other through anti-backlash gearing.

13. The apparatus of claim 12, wherein said third and fourth sets of cutting tools include cutting edges having profiles which correspond to the shape of said scroll lines, the cutting edges of said third set leading the cutting edges of said fourth set.

14. The apparatus of claim 13, wherein said leading cutting edges extend beyond a pitch circle of their corresponding cutting tools of said third set and said trailing cutting edges do not extend to a pitch circle of their corresponding cutting tools of said fourth set, whereby said trailing cutting edges have a lower linear velocity then said leading cutting edges.

15. The apparatus of claim 14, further comprising feeding means for feeding said web between said third and fourth sets of cutting tools.

16. The apparatus of claim 15, wherein said feeding means includes draw rolls mounted on said third and fourth shafts.

17. The apparatus of claim 16, wherein said first, second, third and fourth shafts are driven in synchronization with each other through anti-backlash gearing.

18. The apparatus of claim 1, wherein said deflecting means includes a deflector roll which is movable transversely of said web.

19. Apparatus for dividing a web of metallic material into a plurality of strips from which polygonally-shaped blanks are to be made, comprising perforating means for perforating said web at predetermined locations, said perforating means including a first set of cutting tools, including punches, mounted on a first rotatable shaft for rotation in one arcuate direction and a second set of cutting tools, including dies, mounted on a second rotatable shaft for rotation in an opposite arcuate direction, said first and second shafts being mounted generally parallel to each other and being driven in synchronization with each other through anti-backlash gearing such that each punch of said first set of cutting tools cooperates with a corresponding die of said second set of cutting tools to punch out polygonally shaped pieces of material from said web as said web is fed between said first and second sets of cutting tools and as said first and second sets of cutting tools are rotated conjointly with said first and second shafts, respectively, and longitudinal scroll slitting means for slitting said web along at least one scroll line which extends generally longitudinally along said web, said longitudinal scroll slitting means slitting said web along said at least one scroll line after said perforating means perforates said web and said longitudinal scroll slitting means including a third set of cutting tools mounted on a third rotatable shaft for rotation in one arcuate direction and a fourth set of cutting tools mounted on a fourth rotatable shaft for rotation in an opposite arcuate direction, said third and fourth shafts being mounted generally parallel to each other and being driven in synchronization with each other through anti-backlash gearing such that each cutting tool of said third set of cutting tools cooperates with a corresponding one of said cutting tools of said fourth set of cutting tools to slit said web along said at least one scroll line as said web is fed between said third and fourth sets of cutting tools, said third and fourth sets of cutting tools including cutting edges having profiles which correspond to the shape of said at least one scroll line, said cutting edges of said third set of cutting tools leading said cutting edges of said fourth set of cutting tools and extending beyond a pitch circle of their corresponding cutting tools of said third set of cutting tools and said cutting edges of said fourth set of cutting tools extending short of a pitch circle of their corresponding cutting tools of said fourth set of cutting tools, whereby said cutting edges of said fourth set of cutting tools have a lower linear velocity than said cutting edges of said third set of cutting tools.

20. The apparatus of claim 19, further comprising lateral cross slitting means for slitting said web along a plurality of separating lines, each of said separating lines extending generally transversely of said web.

21. The apparatus of claim 20, wherein said lateral cross slitting means cuts said web into a plurality of individual strips.

22. The apparatus of claim 21, wherein a plurality of blanks can be made from each of said strips, whereby each of said strips can be cut into plurality of blanks.

23. The apparatus of claim 21, wherein only a single blank can be made from each of said strips, whereby each of said strips is a blank.

24. The apparatus of claim 21, further comprising transporting means for transporting said individual strips to stacking means for stacking said individual strips one on top of the other.

25. The apparatus of claim 20, wherein said lateral cross slitting means includes at least a pair of cooperating cutting tools having cutting edges which travel at the same angular velocity, said cutting edges of said at least a pair of cooperating cutting tools having a substantially zero clearance between them at a point before they reach their maximum engagement.

26. The apparatus of claim 19, wherein said punches and said dies have a triangular cross-sectional shape and have inclined bases, one of which trails the other.

27. The apparatus of claim 19, further comprising feeding means for feeding said web between said third and fourth sets of cutting tools.

28. The apparatus of claim 27, wherein said feeding means includes draw rolls mounted on said third and fourth shafts.

29. The apparatus of claim 28, wherein said first, second, third, and fourth shafts are driven in synchronization with each other through anti-backlash gearing.

30. The apparatus of claim 19, further comprising deflecting means positioned between said perforating means and said longitudinal scroll slitting means for deflecting said web such that said web is partially wrapped about said cutting tools of one of said first and second sets of cutting tools and said cutting tools of one of said third and fourth sets of cutting tools.

31. The apparatus of claim 30, wherein said deflecting means includes a deflector roll which is movable transversely of said web.

* * * * *